US012462160B2

(12) United States Patent
Takahashi et al.

(10) Patent No.: US 12,462,160 B2
(45) Date of Patent: Nov. 4, 2025

(54) PERFORMING DISTRIBUTED PROCESSING USING LAYERS OF A NEURAL NETWORK DIVIDED BETWEEN A FIRST DEVICE AND A SECOND DEVICE

(71) Applicant: Sony Corporation, Tokyo (JP)

(72) Inventors: Ryo Takahashi, Tokyo (JP); Yukio Oobuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1190 days.

(21) Appl. No.: 17/263,868

(22) PCT Filed: Jul. 10, 2019

(86) PCT No.: PCT/JP2019/027415
§ 371 (c)(1),
(2) Date: Jan. 27, 2021

(87) PCT Pub. No.: WO2020/026741
PCT Pub. Date: Feb. 6, 2020

(65) Prior Publication Data
US 2021/0312295 A1  Oct. 7, 2021

(30) Foreign Application Priority Data

Aug. 3, 2018  (JP) ................. 2018-147180

(51) Int. Cl.
*G06F 18/21* (2023.01)
*G06N 3/086* (2023.01)
*G06N 3/048* (2023.01)

(52) U.S. Cl.
CPC ......... *G06N 3/086* (2013.01); *G06F 18/2163* (2023.01); *G06F 18/217* (2023.01); *G06N 3/048* (2023.01)

(58) Field of Classification Search
CPC ........ G06N 3/086; G06N 3/048; G06N 3/045; G06N 3/082; G06F 18/2163; G06F 18/217

See application file for complete search history.

(56) References Cited

U.S. PATENT DOCUMENTS 11,205,110 B2 * 12/2021 Willson ................ G06F 40/216
2016/0284400 A1 * 9/2016 Yakopcic ............ G11C 13/0002
(Continued)

FOREIGN PATENT DOCUMENTS

CN     106960281 A    7/2017
CN     108021983 A    5/2018
(Continued)

OTHER PUBLICATIONS

He Li, Learning IoT in Edge: Deep Learning for the Internet of Things with Edge Computing, Jan. 2018, p. 6 (Year: 2018).*
(Continued)

*Primary Examiner* — KC Chen
*Assistant Examiner* — Kuang F Chen
(74) *Attorney, Agent, or Firm* — Wolf, Greenfield & Sacks, P.C.

(57) ABSTRACT

An information processing method according to the present disclosure includes the steps of: evaluating, by a computer, a neural network having a structure held in a divided manner by a first device and a second device based on information on transfer of information between the first device and the second device in the neural network; and determining, by the computer, the structure of the neural network based on the evaluation of the neural network.

11 Claims, 13 Drawing Sheets

(56) References Cited

U.S. PATENT DOCUMENTS

| | | | |
|---|---|---|---|
| 2017/0228639 A1* | 8/2017 | Hara | G06N 7/01 |
| 2018/0307969 A1* | 10/2018 | Shibahara | G06F 18/24317 |
| 2019/0057308 A1* | 2/2019 | Cho | G06N 3/065 |
| 2019/0073335 A1* | 3/2019 | Foley | G06V 40/10 |
| 2019/0083335 A1* | 3/2019 | Zhang | A61G 5/04 |
| 2019/0197359 A1* | 6/2019 | Haneda | G06N 3/08 |
| 2019/0354852 A1* | 11/2019 | Sadowski | G06N 3/048 |

FOREIGN PATENT DOCUMENTS

| | | | |
|---|---|---|---|
| WO | WO-2017134554 A1 | 8/2017 | |
| WO | WO-2017154284 A | 9/2017 | |
| WO | WO-2018003457 A1 * | 1/2018 | G06F 17/2818 |

OTHER PUBLICATIONS

International Written Opinion and English translation thereof mailed Sep. 10, 2019 in connection with International Application No. PCT/JP2019/027415.

International Preliminary Report on Patentability and English translation thereof mailed Feb. 18, 2021 in connection with International Application No. PCT/JP2019/027415.

International Search Report and English translation thereof mailed Sep. 10, 2019 in connection with International Application No. PCT/JP2019/027415.

Lane et al., Deepx: A software accelerator for low-power deep learning inference on mobile devices. 15th ACM/IEEE International Conference on Information Processing in Sensor Networks (IPSN). Apr. 11, 2016. 12 pages.

* cited by examiner

FIG.6

| DEVICE ID | TYPE | ARITHMETIC UNIT INFORMATION | ... |
|---|---|---|---|
| ... | ... | ... | ... |
| A01 | SERVER | ARITHMETIC UNIT INFORMATION #1 | ... |
| A02 | TERMINAL | ARITHMETIC UNIT INFORMATION #2 | ... |
| A03 | TERMINAL | ARITHMETIC UNIT INFORMATION #3 | ... |
| ... | ... | ... | ... |

FIG.7

| COMMUNICATION STANDARD ID | COMMUNICATION STANDARD | CORRECTION VALUE | ... |
|---|---|---|---|
| ... | ... | ... | ... |
| B01 | 3G | CORRECTION VALUE #11 | ... |
| B02 | 4G | CORRECTION VALUE #12 | ... |
| B03 | 5G | CORRECTION VALUE #13 | ... |
| ... | ... | ... | ... |

| MODEL ID | STRUCTURE INFORMATION | TRANSFER INFORMATION | EVALUATION VALUE | ... |
|---|---|---|---|---|
| ... | ... | ... | ... | ... |
| M01 | STRUCTURE INFORMATION #1 | TRANSFER INFORMATION #1 | EVALUATION VALUE #1 | ... |
| ... | ... | ... | ... | ... |

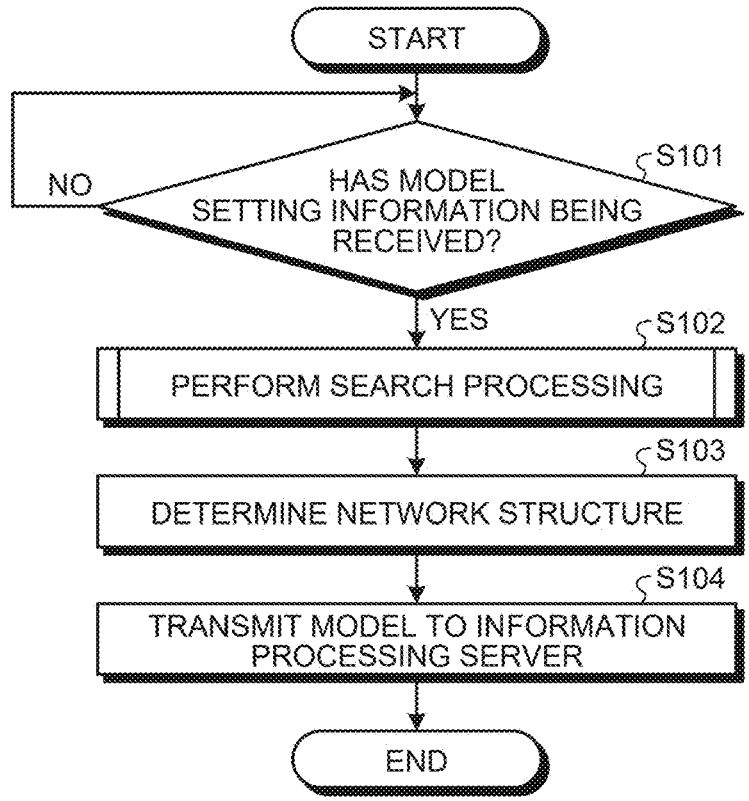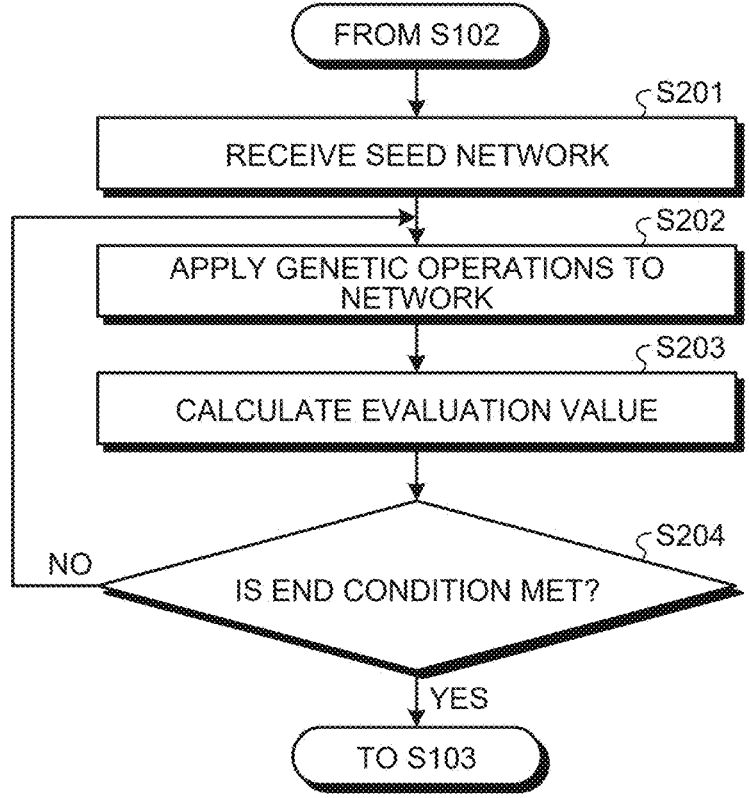

PERFORMING DISTRIBUTED PROCESSING USING LAYERS OF A NEURAL NETWORK DIVIDED BETWEEN A FIRST DEVICE AND A SECOND DEVICE

CROSS-REFERENCE TO RELATED APPLICATIONS

This application claims the benefit under 35 U.S.C. § 371 as a U.S. National Stage Entry of International Application No. PCT/JP2019/027415, filed in the Japanese Patent Office as a Receiving Office on Jul. 10, 2019, which claims priority to Japanese Patent Application Number JP2018-147180, filed in the Japanese Patent Office on Aug. 3, 2018, each of which is hereby incorporated by reference in its entirety.

FIELD

The present disclosure relates to an information processing method, an information processing device, and an information processing program, and in particular, to processing to automatically search for a structure of a neural network.

BACKGROUND

Neural networks each simulating a mechanism of a brain nervous system are used in various technical fields. Since the accuracy of learning by a neural network is known to greatly depend on given data and the structure of the network, technologies have been proposed to search for an appropriate structure in the neural network.

For example, a technology is known to efficiently search for a structure in accordance with an environment by updating a Pareto optimal solution based on an evaluation result of a neural network, and generating another neural network having a different structure from the neural network related to the Pareto optimal solution.

CITATION LIST

Patent Literature

Patent Literature 1: WO2017/154284

SUMMARY

Technical Problem

According to the conventional technology, an optimal structure is searched for while sequentially generating a network structure using a genetic operation. At this time, the conventional technology takes into account a calculation amount in addition to a recognition performance, and therefore, can obtain a network structure processable by even a computer having a low calculation performance.

However, the conventional technology assumes that a single device processes a neural network. Therefore, when, for example, distributed processing is performed in which a plurality of devices share the neural network, it is not always possible to search for an optimal network structure.

Hence, the present disclosure proposes an information processing method, an information processing device, and an information processing program capable of searching for an appropriate network structure in the distributed processing of the neural network.

Solution to Problem

To solve the above problems, an information processing method according to the present disclosure includes the steps of: evaluating, by a computer, a neural network having a structure held in a divided manner by a first device and a second device based on information on transfer of information between the first device and the second device in the neural network; and determining, by the computer, the structure of the neural network based on the evaluation of the neural network.

Advantageous Effects of Invention

An information processing method, an information processing device, and an information processing program according to the present disclosure are capable of searching for an appropriate network structure in the distributed processing of the neural network. The effects described herein are not necessarily limited, and may be any of the effects described in the present disclosure.

BRIEF DESCRIPTION OF DRAWINGS

FIG. 6 is a diagram illustrating an example of an arithmetic unit information storage unit according to the first embodiment of the present disclosure.

FIG. 7 is a diagram illustrating an example of a communication standard storage unit according to the first embodiment of the present disclosure.

FIG. 8 is a diagram illustrating an example of a model storage unit according to the first embodiment of the present disclosure.

FIG. 13 is a flowchart illustrating a procedure of information processing according to the first embodiment of the present disclosure.

FIG. 14 is a flowchart illustrating a procedure of search processing according to the first embodiment of the present disclosure.

DESCRIPTION OF EMBODIMENTS

Figure 1:
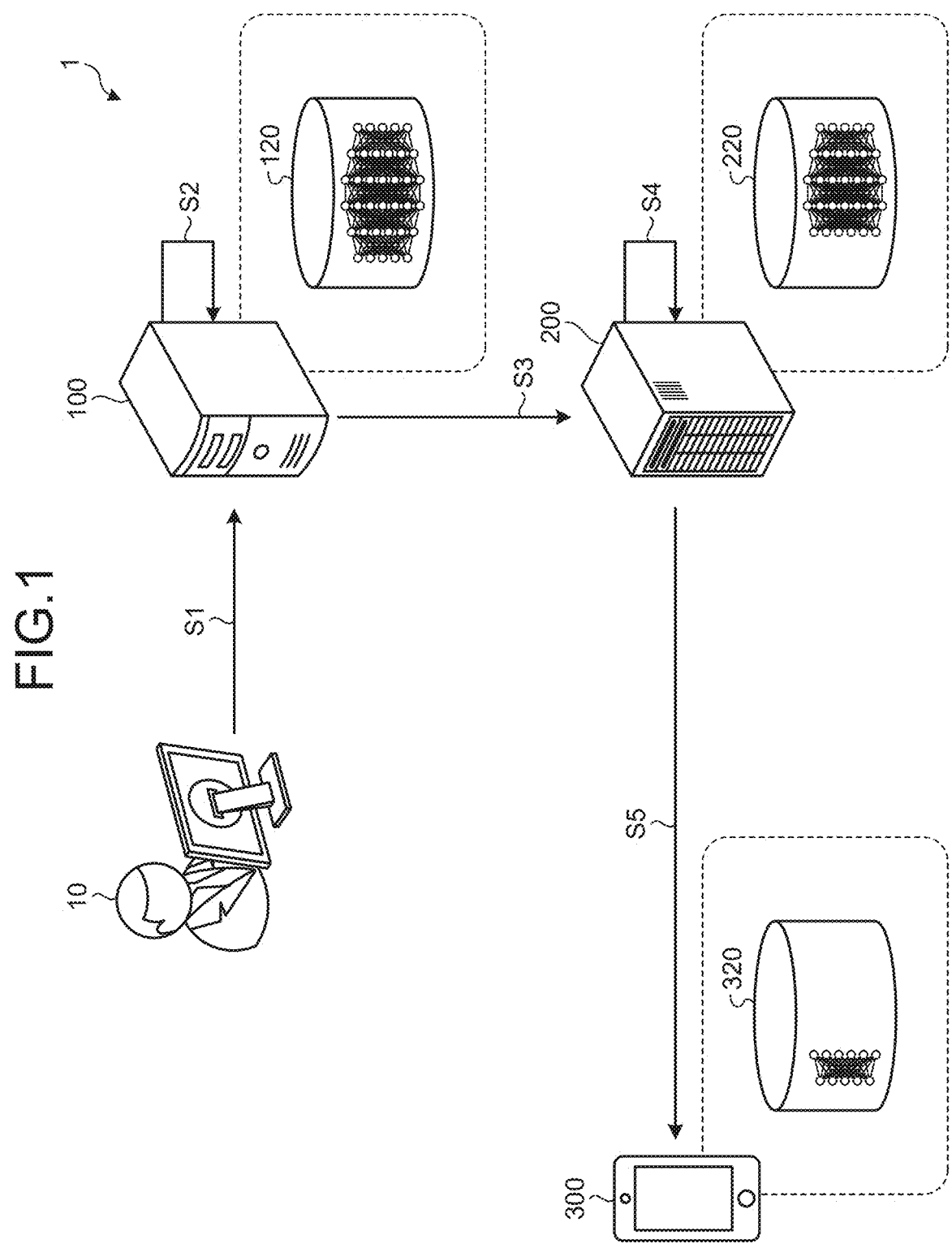
FIG. 1 is a diagram illustrating an information processing system according to a first embodiment of the present disclosure.

The following describes embodiments of the present disclosure in detail based on the drawings. In the following

1. First Embodiment

[1-1. Neural Network According to Present Disclosure]

A neural network is a model simulating a human brain neural circuit, and is a technique to achieve a learning ability possessed by humans on a computer. One of the features of the neural network is that it has the learning ability. In the neural network, artificial neurons (nodes) forming a network through synapses change the connection strength of the synapses through learning to acquire a problem solving ability. That is, the neural network repeats the learning to automatically infer a rule for solving problems.

Examples of the learning by the neural network include image recognition and voice recognition. In the neural network, for example, a handwritten numeral pattern is repeatedly learned to make it possible to classify received image information into any one of the digits 0 to 9. The learning ability possessed by the neural network as described above attracts attention as a key to develop artificial intelligence. The pattern recognition power possessed by the neural network is also expected to be applied to various industrial fields.

The accuracy of the learning by the neural network is known to greatly depend on given data and the network structure. That is, in the learning by the neural network, the amount and quality of the given data directly affects the performance. In addition, even if the same data is given, neural networks having different network structures may greatly differ in learning accuracy.

In processing by the neural network, a calculation amount is one of the important indicators, in addition to the learning accuracy. In the neural network, the calculation amount is obtained depending on, for example, the network structure. In the neural network, the learning accuracy generally tends to increase as the calculation amount increases.

However, since the calculation amount greatly affects the memory usage and the execution time of hardware loaded with the neural network, the neural network having high learning accuracy is not necessarily the best. In other words, in the neural network, the calculation amount and the learning accuracy are in what is called a trade-off relation. Hence, a method for searching for a network structure having higher learning accuracy while reducing the calculation amount is desired.

Information processing according to the present disclosure evaluates a generated neural network by focusing on the search for the network structure as described above. The information processing according to the present disclosure then generates a neural network having an efficient network structure based on the evaluation result, and provides a user the generated neural network. In the present disclosure, the generation of the neural network includes processing to update the structure of an existing neural network.

The generation of the neural network may be achieved by, for example, genetic operations including, for example, mutation and crossover. The mutation may be a model obtained by modeling mutation of a gene found in a living organism. That is, in an information processing method according to the present disclosure, each layer constituting the network is regarded as a gene, and is mutated to generate another neural network having a different network structure. The crossover mentioned above may be a model obtained by modeling partial exchange of chromosomes in crossing of the living organisms. That is, in the information processing method according to the present disclosure, the above-described other neural network can be generated by partially exchanging layer configurations of two networks. Details of the mutation and the crossover according to the present disclosure will be described later.

The neural network according to the present disclosure has a structure distributed to a first device and a second device. For example, the first device is, for example, an Internet of Things (IoT) device, and is a computer having a relatively low calculation performance. The second device is, for example, a server device on the cloud, and is a computer having a relatively high calculation performance. As an example, the first device is a camera having a photographing function, and the second device is a server device connected to the camera through, for example, a wireless network. In this case, the assumed information processing is, for example, image recognition processing on an image captured by the camera.

When advanced processing such as the image recognition is performed using a computer, such as an IoT device, having a relatively low calculation performance, the processing is desirably performed in a distributed manner with a device capable of performing the advanced processing, instead of performing the processing using only the IoT device. For example, the information processing using the neural network can be distributed by distributing, to the server, a range of the neural network from an input layer to the former stage portion of an intermediate layer to the IoT device, and distributing a range of the neural network from the latter stage portion of the intermediate layer to an output layer.

In this case, the IoT device acquires intermediate data smaller in size than input data through a relatively small-scale neural network. In other words, the IoT device acquires the intermediate data that has been compressed, so as to have a smaller information amount than that of the input data (for example, image data) supplied to the input layer. After such compression processing, the IoT device transmits the intermediate data to the server device. The server device performs the processing of the latter stage portion of the relatively large-scale neural network based on the acquired intermediate data. Such distributed processing can achieve the advanced recognition processing while keeping resources such as electric power, which is consumed less than that when the input data is transmitted as it is to the server device.

Hence, in the information processing method according to the present disclosure, in addition to the above-described evaluation of, for example, the calculation amount, the compression processing is performed in the first device, and the neural network divided into the former stage and the latter stage is evaluated based on information on data transfer including, for example, a determination of in which layer of the neural network the intermediate data is to be transferred (hereinafter, this place of transfer is called "transfer point"). Thereby, the information processing method according to the present disclosure can appropriately search for the efficient structure in the divided neural network. The following describes the information processing method according to the present disclosure by giving specific examples.

[1-2. Outline of Information Processing According to First Embodiment]

FIG. 1 is a diagram illustrating an outline of information processing according to a first embodiment of the present disclosure. The information processing according to the first embodiment of the present disclosure is performed by an information processing system 1 illustrated in FIG. 1. The information processing system 1 includes an information processing device 100, an information processing server 200, and a terminal device 300.

The information processing device 100 is an example of an information processing device according to the present disclosure, and is a server device managed by a user 10 who searches for a structure of a neural network. The information processing device 100 generates a neural network according to operations of the user 10.

The information processing server 200 is an example of the second device according to the present disclosure, and is a server device that performs processing of the latter stage in the neural network generated by the information processing device 100.

The terminal device 300 is an example of the first device according to the present disclosure, and is an information processing terminal that performs processing of the former stage in the neural network generated by the information processing device 100.

Using FIG. 1, the outline of the information processing according to the present disclosure will be described below along the flow. First, through a predetermined user interface provided by the information processing device 100, the user 10 specifies a neural network that the user 10 wants to generate (Step S1). For example, the user 10 specifies a structure of a basic neural network suitable for processing (for example, image recognition or voice recognition) that the user 10 wants to execute. As an example, when generating a neural network for performing the image recognition, the user 10 specifies, for example, a layer structure according to, for example, a resolution of received image data.

The user 10 also specifies information on the information processing server 200 and the terminal device 300 that actually perform processing based on the neural network. For example, the user 10 specifies, for example, computing power possessed by the terminal device 300 and a service providing destination of the information processing server 200 to be loaded with the latter stage neural network. The user 10 also specifies, for example, a communication standard between the terminal device 300 and the information processing server 200.

Figure 2:
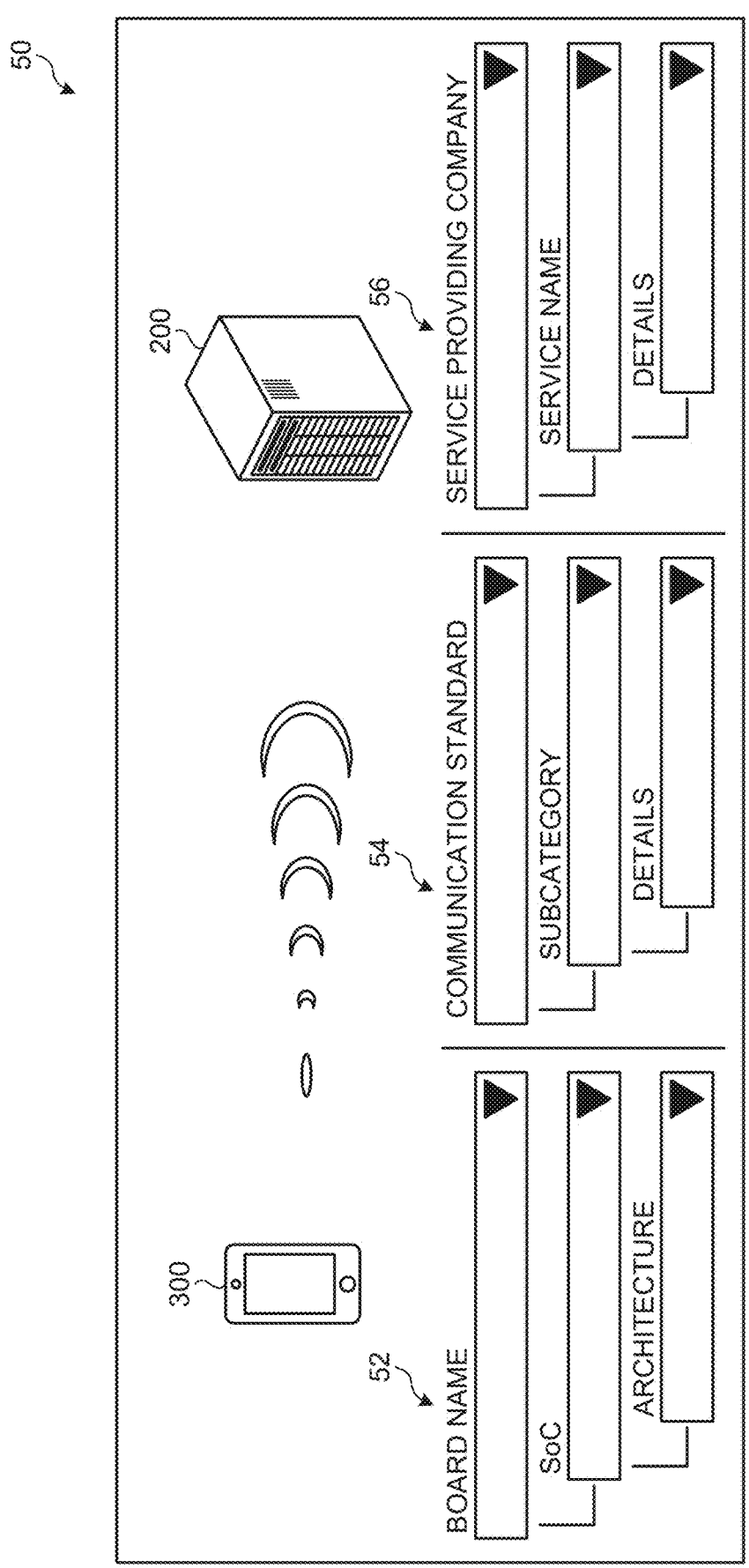
FIG. 2 is a diagram illustrating an example of a user interface according to the present disclosure.

The above-described operation will be described using FIG. 2. FIG. 2 is a diagram illustrating an example of the user interface according to the present disclosure. The user 10 enters, through a user interface 50, information on the neural network that the user 10 wants to generate.

For example, the user 10 enters information on an arithmetic unit of the terminal device 300 that processes the former stage of the neural network. For example, the user 10 selects a board name, a system on a chip (SoC), and an architecture included in the terminal device 300 from a pull-down display 52. Although details will be described later, the information processing device 100 stores therein predetermined numerical values corresponding to these pieces of selected information, and can change the structure of the neural network according to the selection of the user 10.

The selection of the information illustrated in FIG. 2 is merely an example, and the pull-down display 52 may be for use in selecting, for example, a model name and a manufacturer name of the terminal device 300. In this case, the information processing device 100 can refer to the arithmetic unit and the computing power corresponding to a selected model by storing information corresponding to the model name and the manufacturer name of the terminal device 300 without the specification of the board name and the like of the terminal device 300 by the user 10.

The user 10 selects, from a pull-down display 54, the communication standard between the terminal device 300 and the information processing server 200 and information in fields of a subcategory and details for specifying more detailed information about the communication standard. The communication standard is, for example, the third generation (3G) standard, the fourth generation (4G) standard, or the Long Term Evolution (LTE) standard.

The user 10 selects, from a pull-down display 56, a name of a service providing company that provides, for example, a cloud server to be loaded with the latter stage portion of the neural network, a specific service name, and detailed information. The service providing company is a company that provides a cloud service for performing relatively advanced processing to, for example, the user 10 or a general company.

The information processing device 100 stores in advance the predetermined numerical values corresponding to the information to be selected by the user 10 in a storage unit 120 as described above, and searches for a structure of a neural network suitable for the information selected by the user 10.

Figure 3:
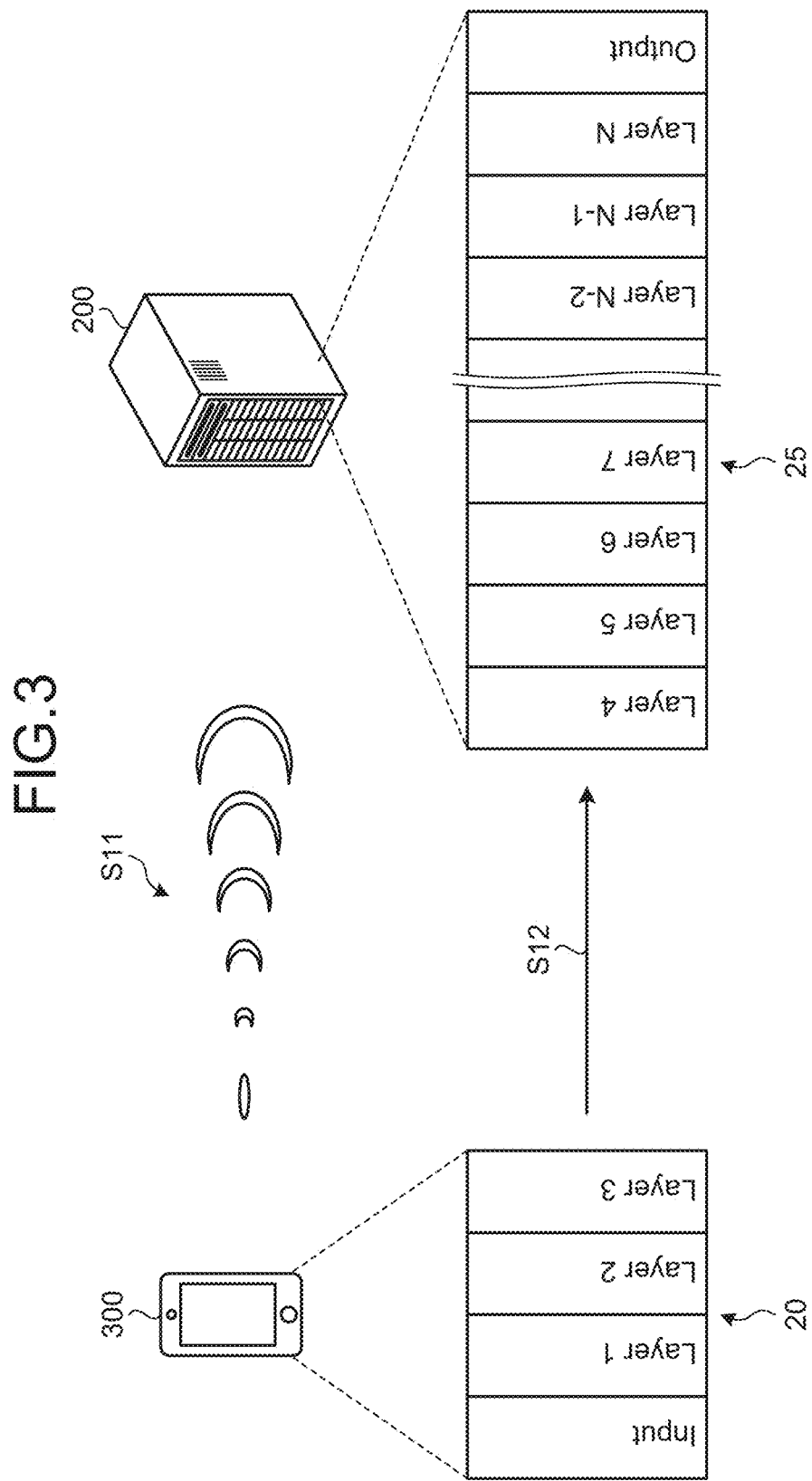
FIG. 3 is a diagram (1) for explaining a structure of a neural network according to the present disclosure.

The following describes, using FIG. 3, the structure of the neural network held in a divided manner in the terminal device 300 and the information processing server 200. FIG. 3 is a diagram (1) for explaining the structure of the neural network according to the present disclosure.

In the example illustrated in FIG. 3, a situation is conceptually illustrated where the intermediate data is transmitted from the terminal device 300 to the information processing server 200 through a network (Step S11). When such processing is performed, the terminal device 300 holds a former stage portion 20 of the neural network, in a neural network having an intermediate layer of an N-th layer (where N is any natural number), as illustrated in FIG. 3. The information processing server 200 holds a latter stage portion 25 of the neural network. The terminal device 300 performs the processing of the former stage portion 20, and transmits the intermediate data at the transfer point (the third layer in the example of FIG. 3) (Step S12). The information processing server 200 receives the intermediate data transmitted at the transfer point, and uses the latter stage portion 25 including the fourth and later layers to perform the processing.

Figure 4:
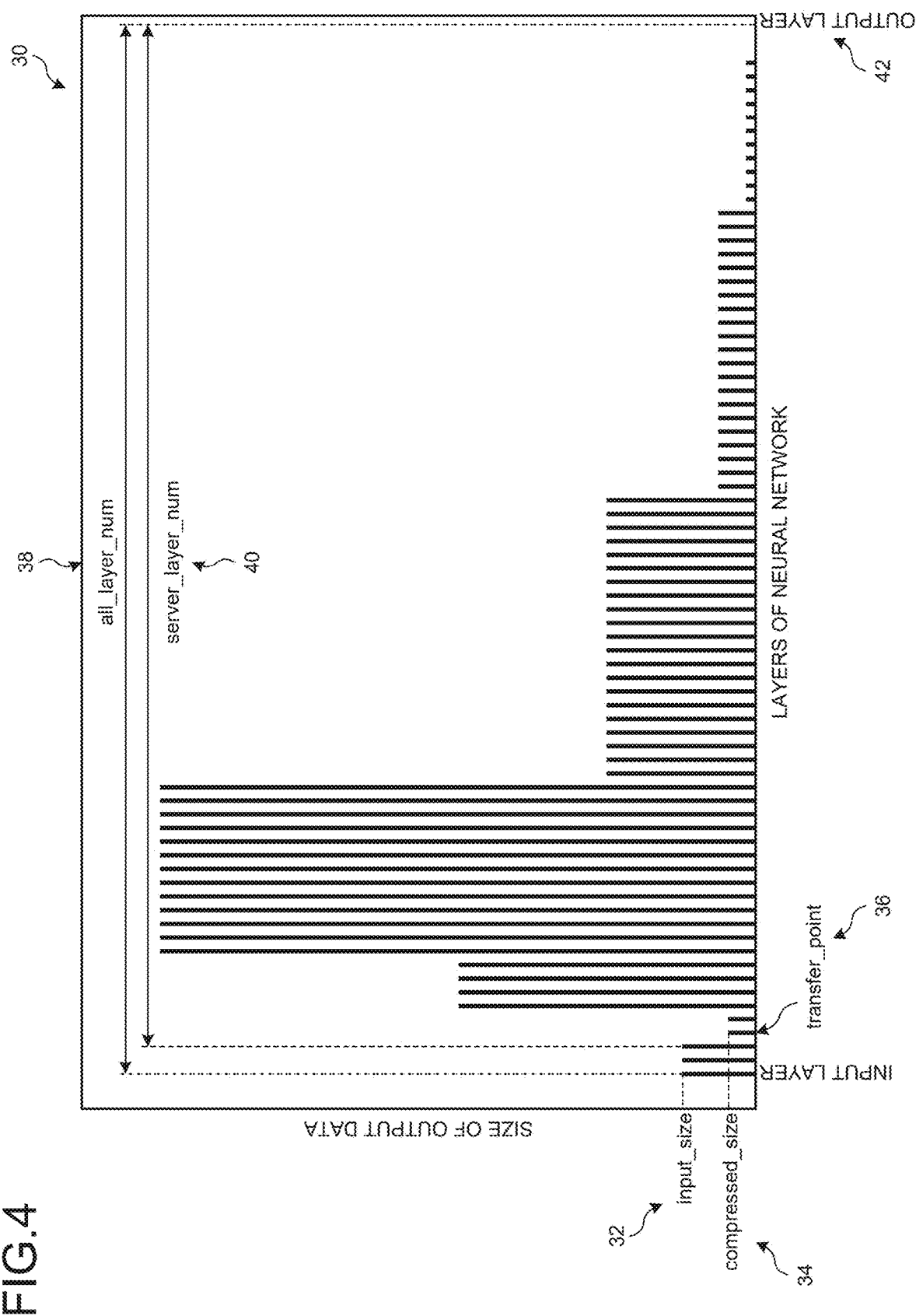
FIG. 4 is a diagram (2) for explaining the structure of the neural network according to the present disclosure.

Subsequently, FIG. 4 is used to conceptually illustrate the information amount handled by the neural network illustrated in FIG. 3. FIG. 4 is a diagram (2) for explaining the structure of the neural network according to the present disclosure.

A graph 30 of FIG. 4 illustrates a relation between the structure of the neural network and the information amount. A display 32 illustrated in FIG. 4 ("input_size" illustrated in FIG. 4) indicates the information amount of the input data supplied to the input layer of the neural network. A display 34 illustrated in FIG. 4 ("compressed_size" illustrated in FIG. 4) indicates the information amount when the information amount is more compressed than that of the input data. A display 36 illustrated in FIG. 4 ("transfer_point" illustrated in FIG. 4) indicates the transfer point that is a point at which the intermediate data is transferred to the information processing server 200.

In the neural network according to the present disclosure, a layer among the layers that lies in a portion deeper than a layer from which information having the maximum size is output (which means a side closer to the input layer (a side closer to the left side) in the example of FIG. 4) and that outputs information having a size smaller than that of information output from the input layer of the neural network is determined to be the transfer point at which the information is to be transferred from the terminal device 300 to the information processing server 200. That is, a layer satisfying the above-described condition is an intermediate layer that serves as the transfer point in the neural network. In the example of FIG. 4, the third layer corresponds to the transfer point, as illustrated in the graph 30.

In the graph 30, a display 38 ("all_layer_num" illustrated in FIG. 4) indicates the total number of layers of the neural network. A display 40 ("server_layer_num" illustrated in FIG. 4) indicates the number of layers of the latter stage portion of the neural network. A display 42 ("OUTPUT LAYER" illustrated in FIG. 4) indicates the output layer of the neural network.

As described above, the information processing device 100 searches for a transfer point that satisfies the condition to determine the structure of the neural network held in a divided manner. The information processing device 100 searches for a transfer point that reduces the information amount of the intermediate data transmitted from the terminal device 300 to the information processing server 200 to an amount as small as possible.

This is because, in the divided neural network, the information is preferably transmitted from the terminal device 300 to the information processing server 200 as quickly as possible, and the efficiency of the information processing is generally improved by reducing the transmitted information amount to an amount as small as possible.

The description will be continued referring back to FIG. 1. As described using FIGS. 2 to 4, the information processing device 100 generates the neural network based on the information specified by the user 10 and the information on the transfer including, for example, the position of the transfer point and the amount of compression of the intermediate data (Step S2).

The information processing device 100 comprehensively evaluates not only the above-described information, but also various types of information including, for example, the calculation amount and the computing power of the terminal device 300, and generates the neural network based on the evaluation result.

For example, the information processing device 100 uses Expression (1) below in calculating an evaluation value of the neural network.

$$V_{eval} = k_1 \cdot V_{recognition} + k_2 \cdot C_{computation} + k_3 \cdot V_{energy\_saving} \quad (1)$$

In Expression (1), "$V_{eval}$" denotes the evaluation value of the neural network. "$V_{recognition}$" is a quantified value of a recognition performance of the neural network. The recognition performance is represented by, for example, an F-measure, precision, recall, and Intersection over Union (IoU) of the recognition processing of the neural network. The information processing device 100 applies appropriate normalization to the above-listed numerical values to obtain a numerical value as the evaluation value.

"$C_{computation}$" is a quantified value of the calculation amount required for the information processing of the neural network. The calculation amount is represented by, for example, the number of product-sum operations and the number of instructions in a specific processor.

"$V_{energy\_saving}$" is a value obtained by modeling how much electric energy is reduced by the compression processing of the network structure of the targeted neural network. An example of calculation of "$V_{energy\_saving}$" will be described using again the graph 30 of FIG. 4. For example, "$V_{energy\_saving}$" is represented as Expression (2) below based on a relation between an output size of each of the layers of the neural network and the size of the input data ("input_size" illustrated in FIG. 4).

$$V_{energy\_saving} = \begin{cases} 0 & \text{if server\_layer\_num} = \text{all\_layer\_num} \\ \dfrac{1}{r_{compression}} \times \dfrac{1}{1 - r_{depth}} & \text{otherwise} \end{cases} \quad (2)$$

As given in Expression (2), "$V_{energy\_saving}$" has a value of "0" when the entire neural network has a structure processed by the second device (information processing server 200). In contrast, "$V_{energy\_saving}$" is obtained by two variables of "$r_{compressinon}$" and "$r_{depth}$" when the neural network is not entirely processed by the server, that is, has a divided structure. "$r_{compressinon}$" is given by, for example, Expression (3) below.

$$r_{compression} = \frac{\text{compressed\_size}}{\text{input\_size}} \quad (3)$$

As given in Expression (3), "$r_{compressinon}$" ratio between "compressed_size" and "input_size". According to Expressions (2) and (3), as "compressed_size" decreases, the value of "$V_{energy\_saving}$" increases, and thus, the neural network is evaluated higher. "$r_{depth}$" is given by, for example, Expression (4) below.

$$r_{depth} = \frac{\text{server\_layer\_num}}{\text{all\_layer\_num}} \quad (4)$$

As given in Expression (4), "$r_{depth}$" is a ratio between "server_layer_num" and "all_layer_num". According to Expressions (2) and (4), as "server_layer_num" increases (in other words, as "$r_{depth}$" increases), the value of "$V_{energy\_saving}$" increases, and thus, the neural network is evaluated higher.

As described above, according to Expressions (2) to (4) given above, the information processing device 100 evaluates that a neural network saves more electric power when the neural network has a structure that transmits "as small intermediate data as possible" at "as early stage (as deep portion) of the neural network as possible".

In Expression (1) above, "$k_1$", "$k_2$", and "$k_3$" are coefficients of respective variables, in other words, represent predetermined weight values for the evaluation. These weight values may be determined in response to specification by the user 10 as to which variables are to be weighted to generate the neural network. The weight values may be automatically determined based on a numerical value (numerical value stored in the information processing device 100) set in advance based on the computing power of the terminal device 300 and a relation, such as the communication standard, between the terminal device 300 and the information processing server 200.

The information processing device 100 uses Expression (1) to evaluate the generated neural network. The information processing device 100 then continues searching for the structure of the neural network until the evaluation value satisfies a predetermined condition. For example, the information processing device 100 uses a genetic structure search method to be described later to change the structure of the neural network, and calculates the evaluation value for the changed structure.

If a found structure satisfies the predetermined condition (for example, if the evaluation value exceeds a threshold value specified in advance by the user 10), the information processing device 100 determines that the structure of the evaluated neural network is optimal, and determines the structure of the neural network to be provided. The information processing device 100 generates a neural network based on the determined structure, and stores the generated neural network in the storage unit 120.

The information processing device 100 then transmits the neural network having the determined structure to the information processing server 200 (Step S3). The information processing server 200 receives the transmitted neural network. The information processing server 200 then divides the received neural network at the transfer point (Step S4). The information processing server 200 stores the latter stage portion of the divided neural network in a storage unit 220.

The information processing server 200 further transmits the former stage portion of the divided neural network to the terminal device 300 (Step S5). The terminal device 300 receives the transmitted former stage portion of the neural network, and then stores the received former stage portion in a storage unit 320.

When an opportunity arises to perform, for example, the image recognition processing using the neural network, the terminal device 300 uses the former stage portion of the neural network to obtain the intermediate data made by compressing the received image data. The terminal device 300 then transmits the intermediate data to the information processing server 200. The information processing server 200 supplies the intermediate data transmitted from the terminal device 300 to the latter stage portion of the neural network to perform the image recognition processing. Thereby, the terminal device 300 and the information processing server 200 can achieve the advanced recognition processing without transmitting the image data having a large information amount as it is to the information processing server 200. Thus, processing loads for the communication and the calculation can be reduced.

As described above, the information processing method according to the present disclosure evaluates the neural network based on the information on the transfer of the information between the first device and the second device in the neural network having the structure held in a divided manner by the first device (terminal device 300) and the second device (information processing server 200). The information processing method according to the present disclosure further determines the structure of the neural network based on the evaluation of the neural network.

Specifically, the information processing method according to the present disclosure uses the information on the transfer for the evaluation to search for the structure of the neural network held in a divided manner based on, for example, the amount of compression of the data transferred by the edge side (terminal device 300) and the place of the transfer point. Thus, with the information processing method according to the present disclosure, the optimal structure can be searched for in the case of performing the distributed processing, such as the recognition processing through communication, using the neural network.

[1-3. Configuration of Information Processing Device According to First Embodiment]

Figure 5:
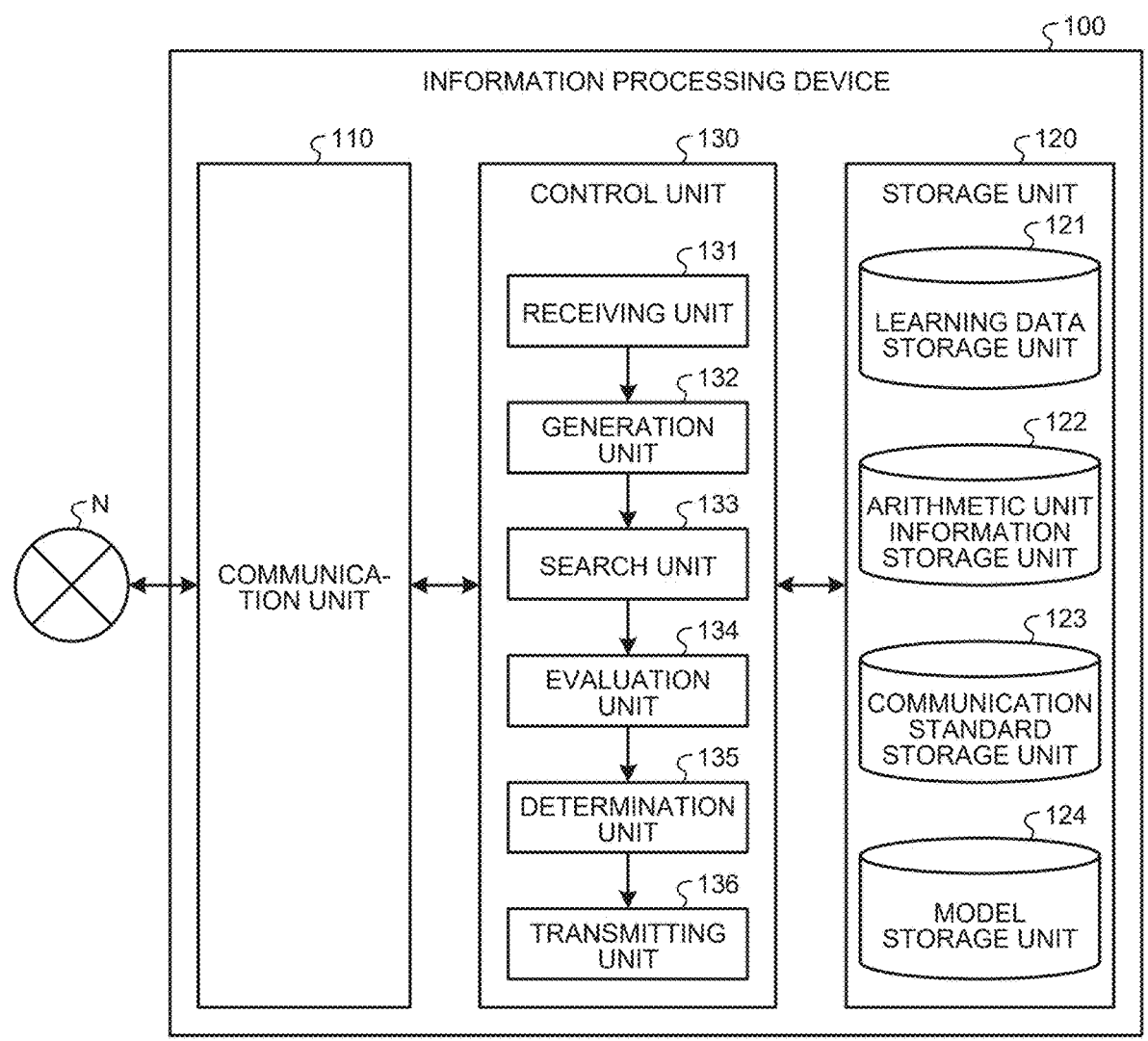
FIG. 5 is a diagram illustrating a configuration example of an information processing device according to the first embodiment of the present disclosure.

The following describes a configuration of the information processing device 100 serving as an example of the information processing device that performs the information processing according to the first embodiment. FIG. 5 is a diagram illustrating a configuration example of the information processing device 100 according to the first embodiment of the present disclosure.

As illustrated in FIG. 5, the information processing device 100 includes a communication unit 110, the storage unit 120, and a control unit 130. The information processing device 100 may include an input unit (such as a keyboard and a mouse) for receiving various operations from, for example, an administrator who manages the information processing device 100, and a display unit (such as a liquid crystal display) for displaying various types of information.

The communication unit 110 is implemented by, for example, a network interface card (NIC). The communication unit 110 is wiredly or wirelessly connected to a network N (such as the Internet), and transmits and receives information to and from, for example, the information processing server 200 and the terminal device 300 through the network N.

The storage unit 120 is implemented by a semiconductor memory device such as a random-access memory (RAM) or a flash memory, or a storage device such as a hard disk or an optical disc. The storage unit 120 includes a learning data storage unit 121, an arithmetic unit information storage unit 122, a communication standard storage unit 123, and a model storage unit 124. The storage units will be sequentially described below.

The learning data storage unit 121 stores therein a learning data group used for learning of the neural network. The learning data is, for example, a set of image data and a set of correct answer data that serves as a recognition result of the image data. The learning data may be acquired as appropriate from, for example, an external server without being held by the information processing device 100.

The arithmetic unit information storage unit 122 stores therein information on arithmetic units included in devices that perform arithmetic processing using the neural network. An example of the arithmetic unit information storage unit 122 according to the first embodiment is illustrated in FIG. 6. FIG. 6 is a diagram illustrating the example of the arithmetic unit information storage unit 122 according to the first embodiment of the present disclosure. In the example illustrated in FIG. 6, the arithmetic unit information storage unit 122 has items including, for example, "device identifier (ID)", "type", and "arithmetic unit information".

The "device ID" is identification information for identifying a device that performs the processing using the neural network. The "type" denotes a type of the device.

The "arithmetic unit information" denotes information on an arithmetic unit included in each of the devices. Although in FIG. 6, the item of the arithmetic unit information is conceptually described as "arithmetic unit information #1", in the item of the arithmetic unit information, various pieces of information are actually stored, such as whether the device has an arithmetic unit capable of floating-point operation or the calculation performance of the arithmetic unit, and information for identifying, for example, a board or an SoC used for the calculation. Although details will be described later, the information processing device 100 may calculate the evaluation of the neural network in accordance with the arithmetic unit included in each of the devices and the calculation performance thereof. At this time, the information processing device 100 may perform a predetermined correction on the evaluation value based on the arithmetic unit information of the device that executes the neural network.

In the example illustrated in FIG. 6, the type of a device identified by a device ID "A01" is "server", and the arithmetic unit information thereof is the "arithmetic unit information #1".

The following describes the communication standard storage unit 123. The communication standard storage unit 123 stores therein a relation of each communication standard used for communication between the first device and the second device when the neural network is held in a distributed manner with a predetermined numerical value given to the communication standard. An example of the communication standard storage unit 123 according to the first embodiment is illustrated in FIG. 7. FIG. 7 is a diagram illustrating the example of the communication standard storage unit 123 according to the first embodiment of the present disclosure. In the example illustrated in FIG. 7, the communication standard storage unit 123 has items including, for example, "communication standard ID", "communication standard", and "correction value".

The "communication standard ID" denotes identification information for identifying a communication standard. The "communication standard" denotes the communication standard used for the communication between the first device and the second device. The "correction value" is a value used for correction according to the specified communication standard when the communication standard is specified by the user 10 in the generation of the neural network. For example, the correction value is used for determining the weight values given in Expression (1). Although in FIG. 7, the item of the correction value is conceptually described as "correction value #11", in the item of the correction value, a numerical value to be actually substituted as each of the weight values or a numerical value such as a ratio to be multiplied in the calculation of the weight values is actually stored.

That is, the example illustrated in FIG. 7 indicates that the communication standard identified by the communication standard ID "B01" is "3G", and the correction value thereof is the "correction value #11".

The following describes the model storage unit 124. The model storage unit 124 stores therein a model (for example, an image recognition model having a divided structure of a neural network) generated by the information processing device 100. An example of the model storage unit 124 according to the first embodiment is illustrated in FIG. 8. FIG. 8 is a diagram illustrating the example of the model storage unit 124 according to the first embodiment of the present disclosure. In the example illustrated in FIG. 8, the model storage unit 124 has items including, for example, "model ID", "structure information", "transfer information", and "evaluation value".

The "model ID" denotes identification information for identifying the model. The "structure information" denotes information on the structure that the model has. Although in FIG. 8, the item of the structure information is conceptually described as "structure information #1", in the item of the structure information, various types of information on the structure of the neural network is actually stored, such as the total number of layers, the data type and the information amount of data received as the input data, and the type of an activation function.

The "transfer information" denotes the information on the transfer in the model held in a divided manner. Although in FIG. 8, the item of the transfer information is conceptually described as "transfer information #1", in the item of the transfer information, a compression ratio of the transferred intermediate data and information on the transfer point are actually stored, for example.

The "evaluation value" denotes the evaluation value of the model. Although in FIG. 8, the item of the evaluation value is conceptually listed as, for example, "evaluation value #1", in the item of the evaluation value, the numerical value of the specific evaluation value of the model calculated using Expression (1) is actually stored, for example.

That is, the example illustrated in FIG. 8 indicates that the model identified by the model ID "M01" has the structure information "structure information #1", the transfer information "transfer information #1", and the evaluation value "evaluation value #1".

The description will be continued referring back to FIG. 5. The control unit 130 is implemented by executing a computer program (for example, an information processing program according to the present disclosure) stored in the information processing device 100 by, for example, a central processing unit (CPU) or a microprocessor unit (MPU) using, for example, a RAM as a work area. The control unit 130 is a controller, and may be implemented by an integrated circuit such as an application specific integrated circuit (ASIC) or a field programmable gate array (FPGA).

As illustrated in FIG. 5, the control unit 130 includes a receiving unit 131, a generation unit 132, a search unit 133, an evaluation unit 134, a determination unit 135, and a transmitting unit 136, and implements or executes functions or operations of information processing to be described below. The internal configuration of the control unit 130 is not limited to the configuration illustrated in FIG. 5, and may be another configuration as long as being a configuration to perform the information processing to be described below.

The receiving unit 131 receives various types of information. For example, the receiving unit 131 receives a request for generation of the neural network from the user 10 through the user interface 50 illustrated in FIG. 2.

The receiving unit 131 receives, together with the request for generation, the type of the information processing, such as the image recognition or the voice recognition, performed by using the neural network from the user 10. The receiving unit 131 also receives information such as the type and resolution of the input data. That is, the receiving unit 131 receives basic information required for determining the basic structure of the neural network from the user 10.

The receiving unit 131 also receives configurations of the first device and the second device that executes the generated neural network, the communication standard between the first device and the second device, and information on an environment in which the neural network is provided, through the user interface 50.

The configurations of the first device and the second device are information specified by the user 10 using, for example, the pull-down display 52 illustrated in FIG. 2, and are, for example, the board name and the name of, for example, the SoC of the first device. The communication standard between the first device and the second device is information specified by the user 10 using, for example, the pull-down display 54 illustrated in FIG. 2. For example, when to perform the processing using a communication standard supported by both the first device and the second device and actually using the neural network, the user 10 specifies, for example, the assumed communication standard between the first device and the second device. The receiving unit 131 receives the communication standard specified by the user 10.

The information on the environment in which the neural network is provided is information specified by the user 10 using, for example, the pull-down display 56 illustrated in FIG. 2, and is, for example, a name of a service providing company that provides, for example, a cloud server to be loaded with the latter stage of the neural network.

The receiving unit 131 may determine the weight values in Expression (1) based on, for example, the configurations of the first device and the second device received from the user 10, the communication standard between the first device and the second device, and the information on the environment in which the neural network is provided. For example, numerical values serving as references are given in advance as the weight values by, for example, the administrator of the information processing device 100. Specifically, if, for example, the communication standard is "3G", the weight values are determined, for example, by correcting the value of "$k_3$" to be relatively large while keeping a relation that the total of "$k_1$", "$k_2$", and "$k_3$" in Expression (1) is "1". This is because, if, for example, the communication standard is "3G", the transfer speed is relatively low, and accordingly, "$V_{energy\_saving}$" is assumed to be a variable that causes the transfer between the first device and the second device to serve as a bottleneck in the information processing. In other words, this is because, if the communication between the first device and the second device is assumed to be performed at a low speed, the information processing in the divided neural network is more likely to be performed smoothly when "$V_{energy\_saving}$" is more weighted. The setting of the weight values is not limited to the above-described example, and may be automatically tuned by, for example, learning processing based on a result of the actual information processing. The weight values may also be determined by receiving an input of numerical values from the user 10.

The generation unit 132 generates the neural network having the structure held in a divided manner by the first device and the second device. For example, the generation unit 132 generates the neural network required by the user 10 based on the information received by the receiving unit 131.

The generation unit 132 updates the generated neural network through processing by the search unit 133 and the evaluation unit 134 to be described later. For example, the generation unit 132 updates the structure of the existing neural network through search processing by the search unit 133. The generation unit 132 updates the neural network based on the evaluation value calculated by the evaluation unit 134. For example, if the evaluation value calculated by the evaluation unit 134 is lower than a predetermined threshold value, the generation unit 132 determines that the structure of the neural network is not optimal, and updates the neural network to a structure newly found by the search unit 133.

The search unit 133 searches for the structure of the neural network. The search unit 133 can search for the structure using various known methods. For example, the search unit 133 may use the genetic operations to search for the structure of the neural network.

Figure 9:
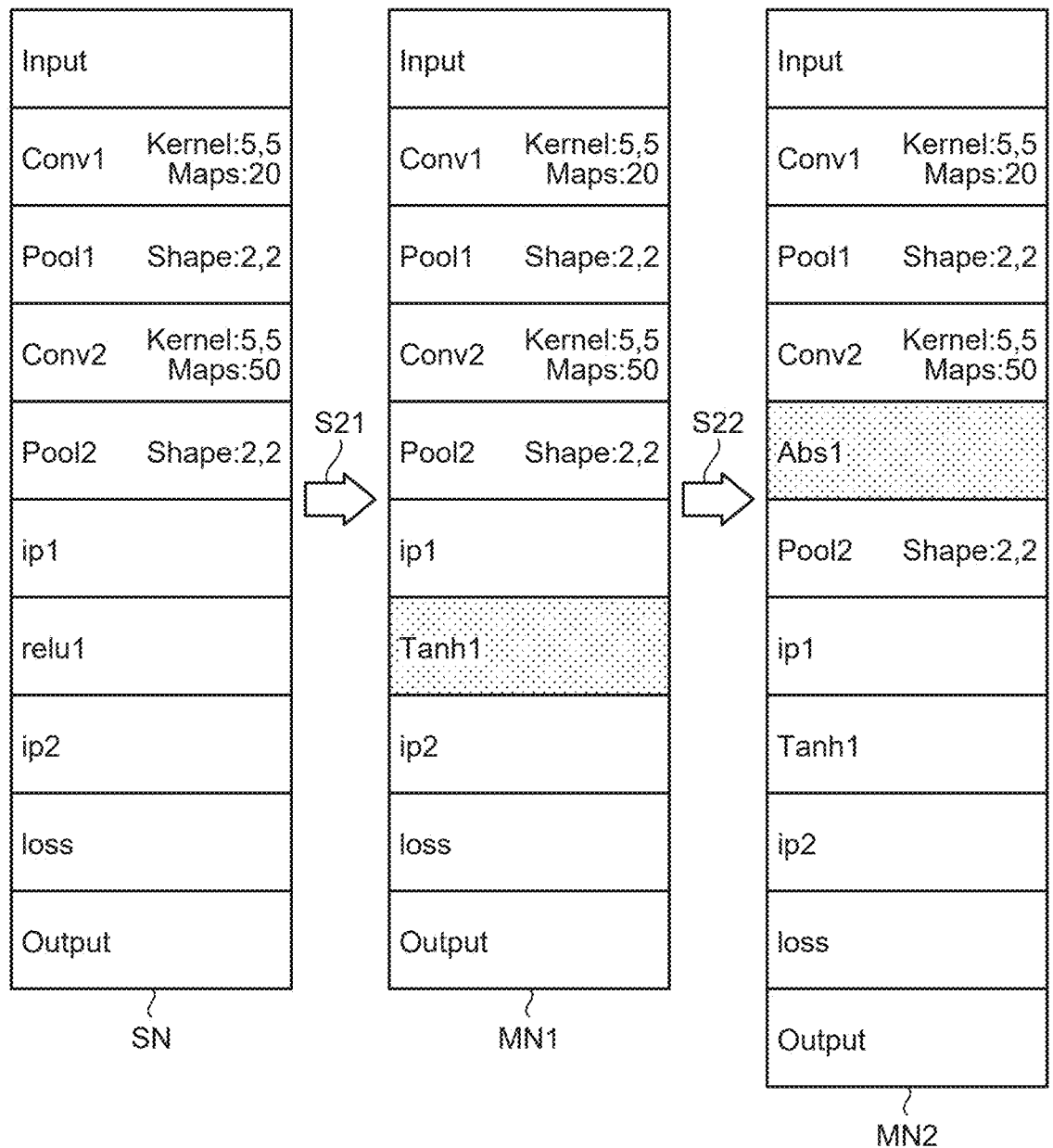
FIG. 9 is a diagram illustrating an example of a structure search by genetic operations according to the present disclosure.

The following describes, using FIG. 9, an example in which the search unit 133 uses the genetic operations to search for the structure of the neural network. FIG. 9 is a diagram illustrating an example of the structure search by genetic operations according to the present disclosure. FIG. 9 illustrates the example of searching for a structure of a neural network (generating a new neural network) using the mutation as one of the genetic operations.

Specifically, in the example illustrated in FIG. 9, another neural network having a different network structure is generated from an already evaluated neural network serving as a base (hereinafter, called "seed network").

As described above, the search for the structure of the neural network using the genetic operations includes, for example, the mutation and the crossover. That is, in the search method according to the present disclosure, each layer constituting the network is regarded as a gene, and the layers are mutated or crossed over to generate the other neural network having the different network structure.

In the example illustrated in FIG. 9, a seed network SN is constituted by 10 layers including "Input" and "Output". "Input" denotes the input layer, and "Output" denotes the output layer. "Conv1" and "Conv2" illustrated in FIG. 9 represent convolution layers. "Pool1" and "Pool2" denote max-pooling layers. As illustrated in FIG. 9, parameters such as a kernel shape and the number of output maps are set in each of "Conv1" and "Conv2". A parameter representing a pool shape is set in each of "Pool1" and "Pool2". Since the layers illustrated in FIG. 9 are generally widely used, detailed description thereof will not be given. The structure of the layers illustrated in FIG. 9 is defined by the user 10 through, for example, the user interface 50 as task-specific information to be processed using the neural network.

Subsequently, a neural network MN1 illustrated in FIG. 9 will be described. The search unit 133 mutates or crosses over the seed network SN to generate the neural network MN1 serving as the other neural network (Step S21).

As illustrated in FIG. 9, the neural network MN1 is obtained by partially changing the layer configuration from that of the network structure of the seed network SN. Specifically, in the neural network MN1, an activation function "relu1" of the seed network SN has changed to another activation function "Tanh1". In this way, in the information processing method according to the present disclosure, the other neural network having the different network structure can be generated by changing the layer type of a layer included in the network structure.

Furthermore, the search unit 133 may mutate or cross over the neural network MN1 to generate a neural network MN2 serving as still another neural network (Step S22).

As illustrated in FIG. 9, in the network structure of the neural network MN2, an activation function "Abs1" is inserted in addition to the layer configuration of the neural network MN1. In this way, in the information processing method according to the present disclosure, the still other neural network MN2 having the different network structure can be generated by newly inserting the layer.

The mutation related to the genetic operations includes operations such as "layer insertion", "layer deletion", "layer type change", "parameter change", "graph branch", and "graph branch deletion" in addition to the above-described processing. The crossover related to the genetic operations is an operation of interchanging layers between a seed network additionally specified by the user 10 and the currently held neural network. Various methods such as one-point crossover, two-point crossover, and multipoint crossover can be supported as a method for interchanging layers.

The structure search processing described above is merely an example, and the method for searching for and generating the structure is not limited to the example using the genetic operations in the information processing method according to the present disclosure.

The evaluation unit 134 evaluates the neural network (in other words, the network structure that the neural network has).

First, the evaluation unit 134 uses the structure of the neural network found by the search unit 133 to learn the learning data held in, for example, the learning data storage unit 121. The evaluation unit 134 then calculates the evaluation value comprehensively taking into account, for example, the information on the transfer, a power saving effect, and the recognition performance and the calculation amount of the neural network, as will be described later. In the above-described learning processing, for example, an existing software library developed for learning and evaluating the neural network may be used as appropriate.

In the present disclosure, the evaluation unit 134 evaluates the neural network based on the information on the transfer of the information between the first device and the second device in the neural network having the structure held in a divided manner by the first device and the second device.

For example, the evaluation unit 134 determines the transfer point at which the information is to be transferred from the first device to the second device to be a layer among the layers of the neural network that lies in a portion deeper than a layer from which information having the maximum size is output and that outputs information having a size smaller than that of information output from the input layer of the neural network. The evaluation unit 134 then evaluates the neural network based on the information on the determined transfer point.

As an example, the evaluation unit 134 evaluates the neural network based on the number of layers that lie in portions shallower than the transfer point and the total number of the layers constituting the neural network. Specifically, the evaluation unit 134 evaluates the neural network based on an indicator value represented by "$V_{energy\_saving}$" given in Expressions (1) to (4) above.

The evaluation unit 134 may comprehensively evaluate the neural network based on not only the information on the transfer, but also other indicator values given in Expression (1) above.

For example, the evaluation unit 134 evaluates the neural network based on an indicator value representing the recognition performance of the neural network. Specifically, the evaluation unit 134 evaluates the neural network based on an indicator value represented by "$V_{recognition}$" in Expression (1) above. As an example, the evaluation unit 134 evaluates the neural network based on, for example, a numerical value obtained by normalizing the F-measure, the precision, the recall, and the IoU of the recognition processing of the neural network as the indicator value.

The evaluation unit 134 also evaluates the neural network based on the calculation amount in the neural network.

Specifically, the evaluation unit 134 evaluates the neural network based on an indicator value represented by "$C_{computation}$" in Expression (1) above. As an example, the evaluation unit 134 evaluates the neural network based on, for example, the number of product-sum operations and the number of instructions in a specific processor when the neural network is executed.

The evaluation unit 134 may also evaluate the neural network based on the information on the performance of the arithmetic processing of the first device. Various devices, such as an IoT device, are assumed as the first device, such as the terminal device 300, that processes the former stage of the neural network. For this reason, the performance of the arithmetic processing possessed by each device is also assumed to variously differ. Therefore, the evaluation unit 134 can obtain an evaluation more conforming to actual conditions by adding the information on the performance of the arithmetic processing of the first device as an evaluation target.

In this case, the evaluation unit 134 may perform the evaluation using Expression (5) below obtained by adding a variable to Expression (1) given above.

$$V_{eval}=k_1 \cdot V_{recognition}+k_2 \cdot C_{computation}+k_3 \cdot V_{energy\_saving}+k_4 \cdot V_{efficient\_arithmetic} \quad (5)$$

Expression (5) further includes a weight value "$k_4$" and a variable "$V_{efficient\_arithmetic}$" as compared with Expression (1). "$V_{efficient\_arithmetic}$" denotes an arithmetic efficiency in the first device. That is, the evaluation unit 134 evaluates the neural network taking into account not only the electricity associated with the communication (transfer), but also characteristics of the device (first device) that processes the neural network, such as the terminal device 300, as a computer.

For example, by increasing the weight for the variable mentioned above, the user 10 can more easily obtain the network structure that increases the arithmetic efficiency on the first device side. This means that when the arithmetic efficiency of a specific form of expression in the first device is low, the evaluation value of a network having a larger number of calculations in that form is lower.

For example, the evaluation unit 134 may evaluate the neural network based on the number of times (number of instructions) of the floating-point operations and the number of times of operations other than the floating-point operations in each of the layers of the neural network held in the first device.

That is, when the terminal device 300 does not have a floating-point arithmetic unit, the evaluation unit 134 reduces the evaluation value of the neural network that involves a relatively large number of floating-point operations. Otherwise, when the weights and the intermediate data are expressed using a method for quantization to, for example, a fixed-point number in many layers of the neural network, the evaluation unit 134 increases the evaluation value of the neural network.

When calculating the evaluation value related to the floating-point operations, the evaluation unit 134 may calculate the variable "$V_{efficient\_arithmetic}$" using an expression given as, for example, Expression (6) below.

$$V_{efficient\_aritmetic} = \frac{\sum_i^{N_{dev}} OIi}{\sum_i^{N_{dev}} (FIi + OIi)} \quad (6)$$

In Expression (6) above, "$N_{dev}$" denotes the number of layers to be processed on the terminal device 300 side. "$FI_i$" denotes the number of instructions in each layer that use the floating-point arithmetic unit. "$OI_i$" denotes the number of other instructions.

Figure 10:
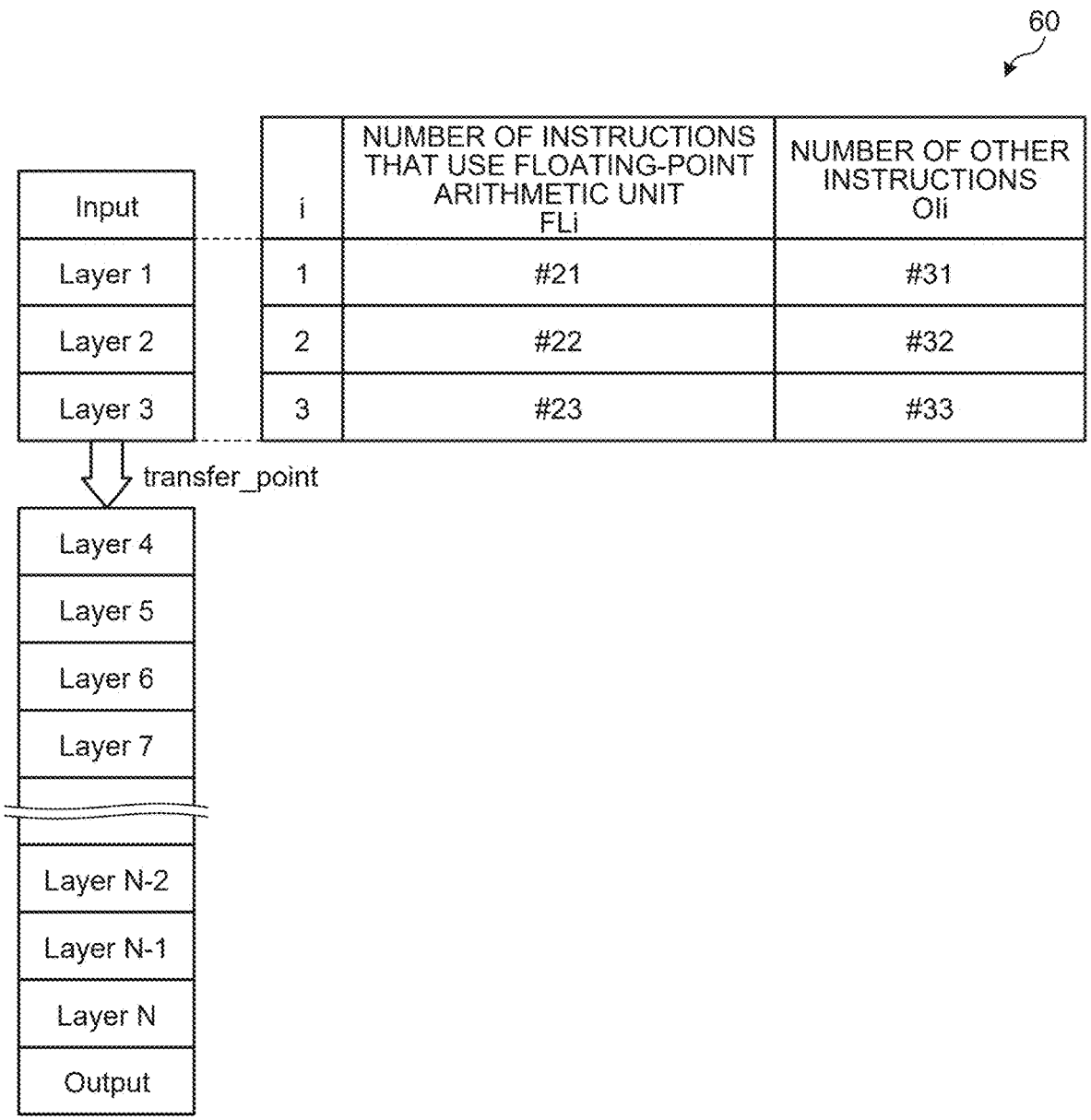
FIG. 10 is a diagram illustrating an example of the structure search based on arithmetic unit information according to the present disclosure.

The above-described operation will be described using FIG. 10. FIG. 10 is a diagram illustrating an example of the structure search based on the arithmetic unit information according to the present disclosure. FIG. 10 illustrated the example in which the transfer point ("transfer_point") is the third layer.

As illustrated in a table 60 of FIG. 10, the evaluation unit 134 calculates the number of instructions that use the floating-point arithmetic unit and the number of the other instructions in each of the layers of the neural network in the terminal device 300. FIG. 10 conceptually illustrates the number of instructions as, for example, "#21". The evaluation unit 134 then substitutes the number of instructions listed in the table 60 into Expression (6) to calculate the value of "$V_{efficient\_arithmetic}$", and calculates the value of "$V_{eval}$" serving as the evaluation value of the neural network. For example, the evaluation unit 134 virtually develops the table 60 illustrated in FIG. 10 in the storage unit 120, and obtains the value of "$V_{eval}$" through the above-described calculation processing.

As given in Expressions (1) and (5), predetermined weight values are set for the respective variables for obtaining the evaluation value. That is, the evaluation unit 134 evaluates the neural network based on values obtained by multiplying the information on the transfer, the indicator value representing the recognition performance of the neural network, the calculation amount in the neural network, and the information on the performance of the arithmetic processing of the first device by the respective predetermined weight values.

As described above, the evaluation unit 134 determines the weight values based on the configurations of the first device and the second device, the communication standard between the first device and the second device, and the information on the environment in which the neural network is provided. Alternatively, the evaluation unit 134 may determine each of the weight values according to specification by the user 10. Through this specification, the user 10 can freely set a weight value that puts more weight on a performance emphasized by the user 10, and thus can obtain the structure of the neural network desired by the user 10.

The determination unit 135 determines the structure of the neural network based on the evaluation result of the neural network obtained by the evaluation unit 134.

For example, if the result of the evaluation by the evaluation unit 134 meets an end condition of the search processing, for example, by exceeding a predetermined threshold value, the determination unit 135 determines that the structure of the neural network is optimal, and determines the structure of the neural network.

If, in contrast, the result of the evaluation by the evaluation unit 134 does not meet the end condition of the search processing, for example, with the resultant value equal to or smaller than the predetermined threshold value, the determination unit 135 may cause the search unit 133 to perform the search processing again, for example, by applying the genetic operations. The end condition may be set to any condition by the user 10. The end condition may be created by combining, for example, the recognition performance and the calculation amount of the neural network, the power saving effect, the compression ratio, and the number of iterations of iterative processing, such as how many times the search processing is iterated.

The transmitting unit 136 transmits the neural network having the structure determined by the determination unit 135 to the second device.

[1-4. Configuration of Information Processing Server According to First Embodiment]

Figure 11:
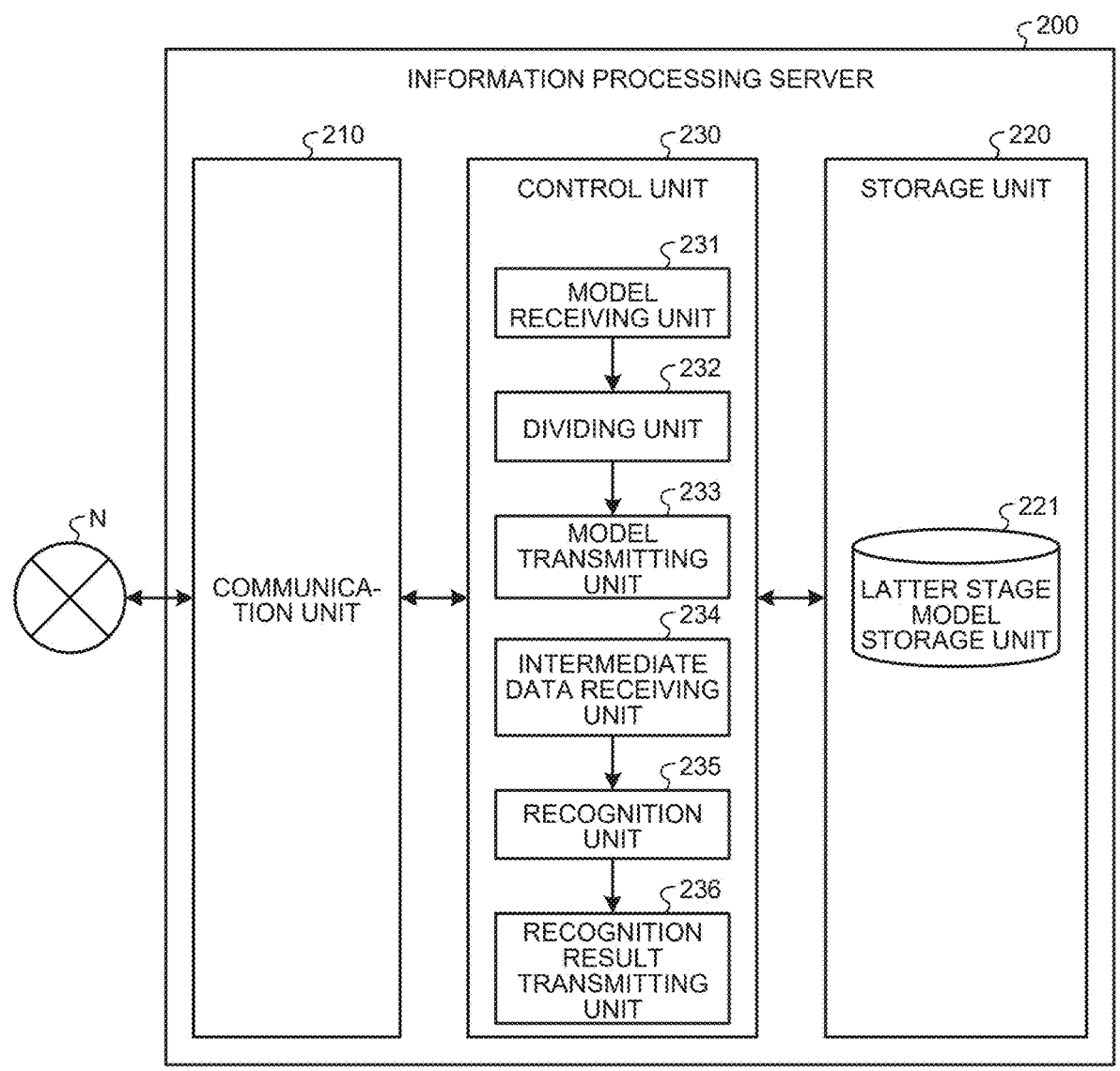
FIG. 11 is a diagram illustrating a configuration example of an information processing server according to the first embodiment of the present disclosure.

The following describes a configuration of the information processing server 200 serving as an example of the second device according to the first embodiment. FIG. 11 is a diagram illustrating the configuration example of the information processing server 200 according to the first embodiment of the present disclosure.

As illustrated in FIG. 11, the information processing server 200 includes a communication unit 210, the storage unit 220, and a control unit 230. The information processing server 200 may include an input unit (such as a keyboard and a mouse) for receiving various operations from, for example, an administrator who manages the information processing server 200, and a display unit (such as a liquid crystal display) for displaying various types of information.

The communication unit 210 is implemented by, for example, a NIC. The communication unit 210 is wiredly or wirelessly connected to the network N, and transmits and receives information to and from, for example, the information processing device 100 and the terminal device 300 through the network N.

The storage unit 220 is implemented by a semiconductor memory device such as a RAM or a flash memory, or a storage device such as a hard disk or an optical disc. The storage unit 220 includes a latter stage model storage unit 221.

The latter stage model storage unit 221 stores therein the latter stage portion that is a portion after the transfer point in the neural network transmitted from the information processing device 100.

The control unit 230 is implemented by executing a computer program stored in the information processing server 200 by, for example, a CPU or an MPU using, for example, a RAM as a work area. The control unit 230 is a controller, and may be implemented by an ASIC or an FPGA.

As illustrated in FIG. 11, the control unit 230 includes a model receiving unit 231, a dividing unit 232, a model transmitting unit 233, an intermediate data receiving unit 234, a recognition unit 235, and a recognition result transmitting unit 236, and implements or executes functions or operations of information processing to be described below. The internal configuration of the control unit 230 is not limited to the configuration illustrated in FIG. 11, and may be another configuration as long as being a configuration to perform the information processing to be described below.

The model receiving unit 231 receives the model (for example, a recognition processing model having the structure of the neural network) transmitted from the information processing device 100.

The dividing unit 232 divides the model received by the model receiving unit 231. The dividing unit 232 then stores the latter stage portion of the neural network in the divided model into the latter stage model storage unit 221.

The model transmitting unit 233 transmits the former stage portion of the neural network in the model divided by the dividing unit 232 to the terminal device 300.

The intermediate data receiving unit 234 receives the intermediate data (the data compressed in the terminal device 300) transmitted from the terminal device 300.

The recognition unit 235 supplies the intermediate data received by the intermediate data receiving unit 234 to the latter stage portion of the neural network to perform various types of the recognition processing. For example, when the input data is the image data, the recognition unit 235 performs the image recognition processing.

The recognition result transmitting unit 236 transmits the result recognized by the recognition unit 235 to the terminal device 300. As a result, a user of the terminal device 300 can obtain the recognition result of the data entered by the user. The recognition result transmitting unit 236 may also transmit the result recognized by the recognition unit 235 to the information processing device 100.

[1-5. Configuration of Terminal Device According to First Embodiment]

Figure 12:
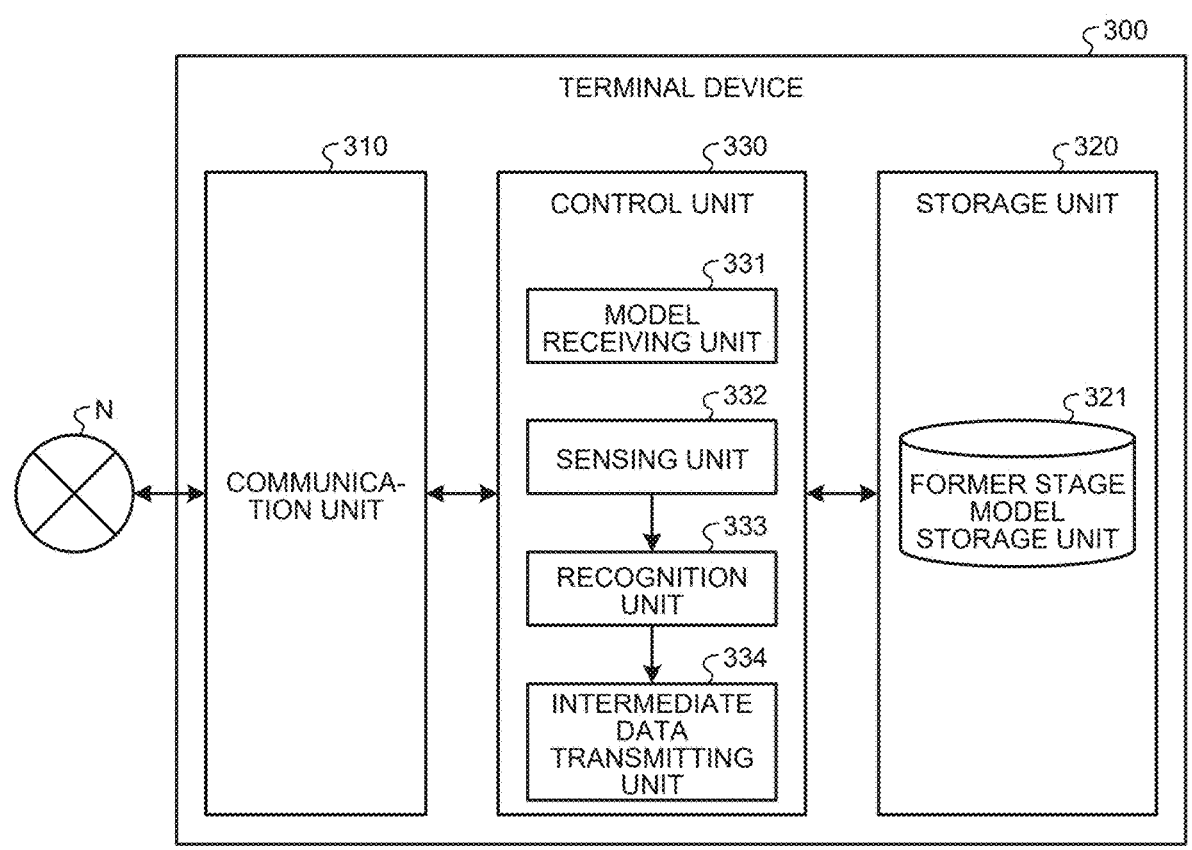
FIG. 12 is a diagram illustrating a configuration example of a terminal device according to the first embodiment of the present disclosure.

The following describes a configuration of the terminal device 300 serving as an example of the first device according to the first embodiment. FIG. 12 is a diagram illustrating a configuration example of the terminal device 300 according to the first embodiment of the present disclosure.

As illustrated in FIG. 12, the terminal device 300 includes a communication unit 310, the storage unit 320, and a control unit 330. The terminal device 300 may include an input unit (such as a keyboard and a mouse) for receiving various operations from, for example, the user who uses the terminal device 300, and a display unit (such as a liquid crystal display) for displaying various types of information.

The communication unit 310 is implemented by, for example, a NIC. The communication unit 310 is wiredly or wirelessly connected to the network N, and transmits and receives information to and from, for example, the information processing device 100 and the information processing server 200 through the network N.

The storage unit 320 is implemented by a semiconductor memory device such as a RAM or a flash memory, or a storage device such as a hard disk or an optical disc. The storage unit 320 includes a former stage model storage unit 321.

The former stage model storage unit 321 stores therein the latter stage portion serving as a stage before (a portion deeper than) the transfer point in the neural network generated by the information processing device 100.

The control unit 330 is implemented by executing a computer program stored in the terminal device 300 by, for example, a CPU or an MPU using, for example, a RAM as a work area. The control unit 330 is a controller, and may be implemented by an ASIC or an FPGA.

As illustrated in FIG. 12, the control unit 330 includes a model receiving unit 331, a sensing unit 332, a recognition unit 333, and an intermediate data transmitting unit 334, and implements or executes functions or operations of information processing to be described below. The internal configuration of the control unit 230 is not limited to the configuration illustrated in FIG. 12, and may be another configuration as long as being a configuration to perform the information processing to be described below.

The model receiving unit 331 receives the former stage portion of the model (for example, the recognition processing model having the structure of the neural network) transmitted from the information processing server 200. The model receiving unit 331 stores the received former stage portion of the model in the former stage model storage unit 321.

The sensing unit 332 uses various types of sensors to perform sensing, and acquires various types of data. For example, the sensing unit 332 uses a camera to acquire image data. The sensing unit 332 may also use a microphone to acquire sound. The sensing unit 332 may acquire not only the information obtained using the sensors, but also every type of information, such as data entered by the user, as long as the information can serve as input data of a model having a neural network.

The recognition unit 333 supplies the information acquired by the sensing unit 332 to the former stage portion of the neural network to perform various types of recognition processing. For example, the recognition unit 333 supplies the input data to the former stage portion of the neural network to obtain the intermediate data having an amount of information more compressed than that of the input data. That is, the recognition unit 333 performs the recognition processing up to the transfer point in the neural network.

The intermediate data transmitting unit 334 transmits the intermediate data output by the recognition unit 333 to the information processing server 200. After transmitting the intermediate data to the information processing server 200, the intermediate data transmitting unit 334 receives the recognition result from the information processing server 200. Thereby, the terminal device 300 can obtain the result of, for example, the image recognition without performing the processing in the latter stage portion that requires a relatively advanced calculation.

[1-6. Procedure of Information Processing According to First Embodiment]

The following describes a procedure of the information processing according to the first embodiment using FIGS. 13 and 14. First, an overall flow of the information processing according to the first embodiment of the present disclosure will be described using FIG. 13. FIG. 13 is a flowchart illustrating the procedure of the information processing according to the first embodiment of the present disclosure.

As illustrated in FIG. 13, the information processing device 100 determines whether model setting information has been received from the user 10 through the user interface 50 (Step S101). If the model setting information has not been received (No at Step S101), the information processing device 100 waits until the model setting information is received.

If, in contrast, the model setting information has been received (Yes at Step S101), the information processing device 100 performs the search processing for the structure of the neural network (Step S102). Details of the search processing will be described later using FIG. 14.

After the search processing is completed, the information processing device 100 determines the network structure of the neural network (Step S103). The information processing device 100 then transmits the model with the structure determined to the information processing server 200 (Step S104).

Using FIG. 4, the following describes a detailed flow of the search processing according to the first embodiment of the present disclosure. FIG. 14 is a flowchart illustrating a procedure of the search processing according to the first embodiment of the present disclosure.

As illustrated in FIG. 14, the information processing device 100 receives the seed network serving as a base (Step S201). The information processing device 100 subsequently applies the genetic operations to the network structure of the seed network (Step S202). Thereby, the information processing device 100 obtains a neural network having a different network structure.

The information processing device 100 then calculates the evaluation value of the obtained neural network (Step S203). The information processing device 100 subsequently determines whether the obtained evaluation value meets the end condition of the search (Step S204).

If the end condition is not met (No at Step S204), the information processing device 100 applies again the genetic operations to the network structure to obtain a neural network having a new structure (Step S202).

If, in contrast, the end condition is met (Yes at Step S204), the information processing device 100 completes the search processing.

2. Second Embodiment

The following describes a second embodiment of the present disclosure. In the above-described first embodiment, the example has been described in which the information processing device 100 uses the information on whether the floating-point arithmetic unit is present and the performance of the floating-point operations when reflecting the calculation performance of the first device (terminal device 300) in the evaluation value. Herein, the information processing device 100 may use a performance of operations different from the above-described operations to reflect the calculation performance of the first device in the evaluation value.

For example, the information processing device 100 according to the second embodiment evaluates the neural network based on a relation between the number of times of multiplication and the number of times of operations other than the multiplication performed in each of the layers of the neural network held in the first device.

This is because more load is imposed on the arithmetic processing as the number of times of multiplication is larger in the case of a device such as an IoT device having a relatively low calculation performance. That is, the information processing device 100 can achieve higher power saving by evaluating the structure of the neural network based on whether the first device can perform the calculation without performing the multiplication.

Specifically, when convolution operations and inner-product operations on the first device is replaced with relatively low-load operations using a known technology called, for example, BinaryNet, the first device can perform approximate calculations by performing simple operations such as XNOR and bit-count operations without performing addition or multiplication. For example, when the first device is implemented by, for example, an ASIC or an FPGA as described above, the above-described replacement can remove a multiplier from the first device, so that greater power saving can be achieved. When to achieve such power saving, the variable given in Expression (6) above is redefined as Expression (7) below.

$$V_{efficient\_aritmetic} = \frac{\sum_{i}^{N_{dev}} OIi}{\sum_{i}^{N_{dev}} (MIi + OIi)} \quad (7)$$

In Expression (7) above, "$N_{dev}$" denotes the number of layers to be processed on the first device side among the total number of the layers of the neural network. "$MI_i$" denotes the number of instructions of multiplication in each layer of the first device. "$OI_i$" denotes the number of instructions other than those of multiplication in each layer of the first device.

The structure of the neural network is evaluated by using Expression (7) to more take into account the characteristics of the first device as a computer. Therefore, the information processing device 100 can more easily obtain the network structure that increases the arithmetic efficiency on the first device side. As a result, the information processing device 100 can indirectly support the first device and the second device to perform the advanced recognition while reducing the electricity.

3. Other Embodiments

The processing according to each of the above-described embodiments may be performed in various different forms other than those in the above-described embodiments.

In each of the above-described embodiments, the neural network having one transfer point has been described as an example. However, a plurality of the transfer points may be present. For example, the processing using the neural network may be performed by three or more devices. Specifically, the processing using the neural network may be performed by, for example, a wearable device such as an earphone, a smart device such as a smartphone, and a cloud server. In this case, the information processing device 100 may generate a structure of the neural network having two or more transfer points, and evaluate the structure.

In each of the above-described embodiments, the power saving has been described as an example of the evaluation amount related to the compression. However, the evaluation amount is not limited to the electric power, and any information may be employed as long as a numerical value having some type of indicator such as the transferred information amount or the calculation amount.

The information processing device 100 may receive feedback of the result of the recognition actually performed by the terminal device 300 and the information processing server 200, and search again for the structure of the neural network. For example, when the number of times of the transfer between the terminal device 300 and the information processing server 200 is equal to or larger than an expected frequency, or the communication state is worse than expected, the information processing device 100 may perform adjustment, for example, by adjusting a weight value for the information on the transfer and searching again for the structure of the neural network.

Of the processes described in the above embodiments, all or some of the processes described as being automatically performed may be manually performed, or all or some of the processes described as being manually performed may be automatically performed using a known method. In addition, the processing procedures, the specific names, and the information including the various types of data and parameters given in the above-described document and the drawings can be freely changed unless otherwise specified. For example, the various types of information illustrated in each of the drawings are not limited to the illustrated information.

The components of the devices illustrated in the drawings are functionally conceptual components, and need not be physically configured as illustrated in the drawings. That is, the specific forms of distribution and integration of the devices are not limited to those illustrated in the drawings, and all or some of the devices can be functionally or physically distributed or integrated in any units according to various loads and use states.

The embodiments and modifications described above can be combined as appropriate without contradicting the content of the processing.

The effects described in this specification are mere examples and are not limited, and other effects may be provided.

4. Hardware Configuration

Figure 15:
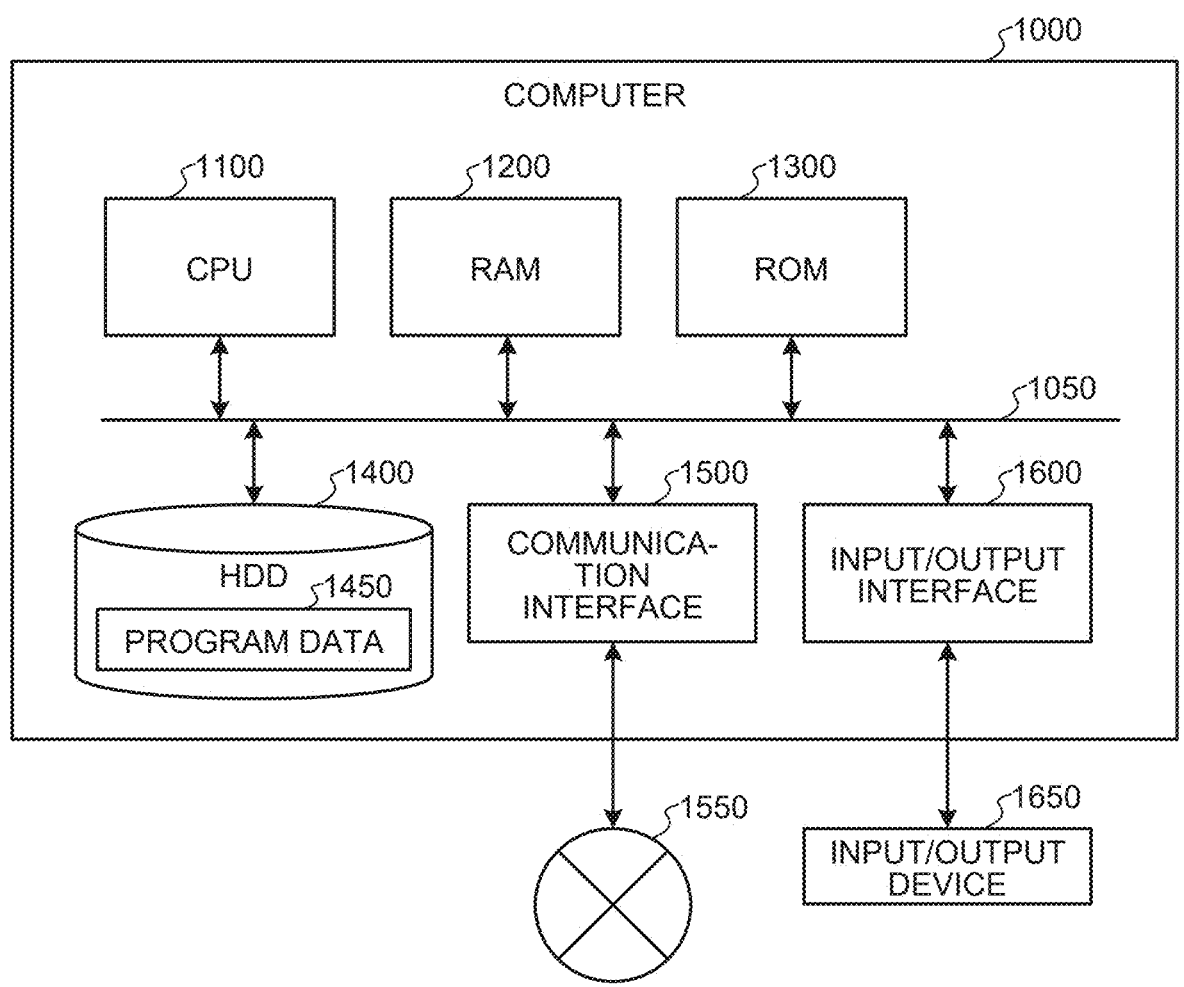
FIG. 15 is a hardware configuration diagram illustrating an example of a computer that implements functions of the information processing device.

The information devices including, for example, the information processing device 100, the information processing server 200, and the terminal device 300 according to the embodiments described above are each implemented by, for example, a computer 1000 having a configuration as illustrated in FIG. 15. The following describes the information processing device 100 according to the first embodiment as an example. FIG. 15 is a hardware configuration diagram illustrating an example of the computer 1000 that implements the functions of the information processing device 100. The computer 1000 includes a CPU 1100, a RAM 1200, a read-only memory (ROM) 1300, a hard disk drive (HDD)

1400, a communication interface 1500 and an input/output interface 1600. The units of the computer 1000 are connected by a bus 1050.

The CPU 1100 operates based on computer programs stored in the ROM 1300 or the HDD 1400, and controls the units. For example, the CPU 1100 loads the computer programs stored in the ROM 1300 or the HDD 1400 into the RAM 1200, and executes processes corresponding to the various computer programs.

The ROM 1300 stores therein, for example, a boot program such as the Basic Input-Output System (BIOS) executed by the CPU 1100 when the computer 1000 starts and computer programs that depend on the hardware of the computer 1000.

The HDD 1400 is a computer-readable recording medium for storing therein, for example, the computer programs to be executed by the CPU 1100 and data to be used by the computer programs in a non-transitory manner. Specifically, the HDD 1400 is a recording medium for recording the information processing program according to the present disclosure serving as an example of program data 1450.

The communication interface 1500 is an interface for connecting the computer 1000 to an external network 1550 (such as the Internet). For example, the CPU 1100 receives data from another device and transmits data generated by the CPU 1100 to another device through the communication interface 1500.

The input/output interface 1600 is an interface for connecting an input/output device 1650 to the computer 1000. For example, the CPU 1100 receives data from an input device such as a keyboard or a mouse through the input/output interface 1600. The CPU 1100 transmits data to an output device such as a display, a speaker, or a printer through the input/output interface 1600. The input/output interface 1600 may also serve as a media interface for reading, for example, a computer program recorded on a predetermined recording medium. The medium is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, when the computer 1000 serves as the information processing device 100 according to the first embodiment, the CPU 1100 of the computer 1000 executes the information processing program loaded in the RAM 1200 to implement the functions of, for example, the control unit 130. The HDD 1400 stores therein the information processing program according to the present disclosure and the data in the storage unit 120. The CPU 1100 reads the program data 1450 from the HDD 1400 and executes it, but may acquire, as another example, the above-described computer programs from another device through the external network 1550.

The present technology can also have the following configurations.

(1)
An information processing method, comprising the steps of:
evaluating, by a computer, a neural network having a structure held in a divided manner by a first device and a second device based on information on transfer of information between the first device and the second device in the neural network; and
determining, by the computer, the structure of the neural network based on the evaluation of the neural network.

(2)
The information processing method according to (1), wherein
a layer among layers of the neural network that lies in a portion deeper than a layer from which information having a maximum size is output and that outputs information having a size smaller than that of information output from an input layer of the neural network is determined to be a transfer point at which the information is to be transmitted from the first device to the second device, and
the neural network is evaluated based on information on the determined transfer point.

(3)
The information processing method according to (2), wherein the neural network is evaluated based on a number of layers that lie in portions shallower than the transfer point and a total number of the layers constituting the neural network.

(4)
The information processing method according to any one of (1) to (3), wherein the neural network is evaluated based on an indicator value that represents a recognition performance of the neural network.

(5)
The information processing method according to any one of (1) to (4), wherein the neural network is evaluated based on a calculation amount in the neural network.

(6)
The information processing method according to any one of (1) to (5), wherein the neural network is evaluated based on information on a performance of arithmetic processing of the first device.

(7)
The information processing method according to (6), wherein the neural network is evaluated based on a number of times of floating-point operations and a number of times of operations other than the floating-point operations in each layer of the neural network held in the first device.

(8)
The information processing method according to (6) or (7), wherein the neural network is evaluated based on a relation between a number of times of multiplication and a number of times of operations other than the multiplication performed in each layer of the neural network held in the first device.

(9)
The information processing method according to any one of (1) to (8), wherein the neural network is evaluated based on values obtained by multiplying the information on transfer, an indicator value that represents a recognition performance of the neural network, a calculation amount in the neural network, and information on a performance of arithmetic processing of the first device by respective predetermined weight values.

(10)
The information processing method according to (9), wherein the weight values are determined based on configurations of the first device and the second device, a communication standard between the first device and the second device, and information on an environment in which the neural network is provided.

(11)
An information processing device comprising:
an evaluation unit configured to evaluate a neural network having a structure held in a divided manner by a first device and a second device based on information on transfer of information between the first device and the second device in the neural network; and
a determination unit configured to determine the structure of the neural network based on the evaluation of the neural network by the evaluation unit.

(12)
An information processing program for causing a computer to function as:
an evaluation unit that evaluates a neural network having a structure held in a divided manner by a first device and a second device based on information on transfer of information between the first device and the second device in the neural network; and
a determination unit that determines the structure of the neural network based on the evaluation of the neural network by the evaluation unit.

REFERENCE SIGNS LIST

1 Information processing system
100 Information processing device
110 Communication unit
120 Storage unit
121 Learning data storage unit
122 Arithmetic unit information storage unit
123 Communication standard storage unit
124 Model storage unit
130 Control unit
131 Receiving unit
132 Generation unit
133 Search unit
134 Evaluation unit
135 Determination unit
136 Transmitting unit
200 Information processing server
300 Terminal device

The invention claimed is:
1. An information processing method executed by processing circuitry, the method comprising:
evaluating transfer of information between layers of a neural network performing distributed processing, wherein the layers of the neural network are divided between a first device and a second device, to determine an evaluation value;
wherein:
a third layer among the layers of the neural network that lies in a portion deeper than a second layer from which second information having a maximum size is output, the third layer outputs third information having a size smaller than that of first information output from an input layer of the neural network, the third layer is determined to be a transfer point at which the third information is to be transmitted from the first device to the second device, and
the neural network is evaluated based on the third information on the determined transfer point;
determining if the evaluation value meets a predetermined condition;
determining a structure of the neural network that meets the predetermined condition; and
executing a distributed process using the determined structure in which the layers of the neural network are divided between the first device and the second device.

2. The information processing method according to claim 1, wherein the neural network is evaluated based on a number of layers that lie in portions shallower than the transfer point and a total number of the layers constituting the neural network.

3. The information processing method according to claim 1, wherein the neural network is evaluated based on an indicator value that represents a recognition performance of the neural network.

4. The information processing method according to claim 1, wherein the neural network is evaluated based on a calculation amount in the neural network.

5. The information processing method according to claim 1, wherein the neural network is evaluated based on information on a performance of arithmetic processing of the first device.

6. The information processing method according to claim 5, wherein the neural network is evaluated based on a number of times of floating-point operations and a number of times of operations other than the floating-point operations in each layer of the neural network held in the first device.

7. The information processing method according to claim 5, wherein the neural network is evaluated based on a relation between a number of times of multiplication and a number of times of operations other than the multiplication performed in each layer of the neural network held in the first device.

8. The information processing method according to claim 1, wherein the neural network is evaluated based on values obtained by multiplying the information on transfer, an indicator value that represents a recognition performance of the neural network, a calculation amount in the neural network, and information on a performance of arithmetic processing of the first device by respective predetermined weight values.

9. The information processing method according to claim 8, wherein the weight values are determined based on configurations of the first device and the second device, a communication standard between the first device and the second device, and information on an environment in which the neural network is provided.

10. An information processing device comprising:
processing circuitry configured to:
evaluate transfer of information between layers of a neural network performing distributed processing, wherein the layers of the neural network are divided between a first device and a second device, to determine an evaluation value;
wherein a third layer among the layers of the neural network that lies in a portion deeper than a second layer from which second information having a maximum size is output, the third layer outputs third information having a size smaller than that of first information output from an input layer of the neural network, the third layer is determined to be a transfer point at which the third information is to be transmitted from the first device to the second device, and
the neural network is evaluated based on the third information on the determined transfer point;
determine if the evaluation value meets a predetermined condition;
determine a structure of the neural network that meets the predetermined condition; and execute a distributed process using the determined structure in which the layers of the neural network are divided between the first device and the second device.

11. A non-transitory computer readable medium storing instructions that, when executed by processing circuitry, perform an information processing method comprising:

evaluating transfer of information between layers of a neural network performing distributed processing, wherein the layers of the neural network are divided between a first device and a second device, to determine an evaluation value;

wherein:

a third layer among the layers of the neural network that lies in a portion deeper than a second layer from which second information having a maximum size is output, the third layer outputs third information having a size smaller than that of first information output from an input layer of the neural network, the third layer is determined to be a transfer point at which the third information is to be transmitted from the first device to the second device, and the neural network is evaluated based on the third information on the determined transfer point;

determining if the evaluation value meets a predetermined condition;

determining a structure of the neural network that meets the predetermined condition; and executing a distributed process using the determined structure in which the layers of the neural network are divided between the first device and the second device.

* * * * *